United States Patent
Morioka et al.

(10) Patent No.: US 6,226,443 B1
(45) Date of Patent: May 1, 2001

(54) RECORDING AND REPRODUCING APPARATUS

(75) Inventors: Yoshihiro Morioka, Kashiba; Hiroyuki Senda, Moriguchi; Takaaki Maegawa, Sakurai, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/138,786

(22) Filed: Aug. 24, 1998

Related U.S. Application Data

(62) Division of application No. 08/674,584, filed on Jul. 2, 1996.

(30) Foreign Application Priority Data

| Jul. 7, 1995 | (JP) | 7-171829 |
| Aug. 3, 1995 | (JP) | 7-198521 |
| Oct. 9, 1995 | (JP) | 7-261270 |

(51) Int. Cl.[7] .................................................. H04N 5/91
(52) U.S. Cl. ........................... 386/82; 386/111; 386/124; 386/125
(58) Field of Search .................... 386/46, 52, 109, 386/111, 112, 123, 124, 101, 66, 125, 126, 68, 70, 82; H04N 5/783

(56) References Cited

U.S. PATENT DOCUMENTS

| 5,164,839 | * 11/1992 | Lang | 386/101 |
| 5,175,631 | * 12/1992 | Juri et al. | 386/109 |
| 5,343,450 | 8/1994 | Hamoda et al. | 369/19 |
| 5,559,764 | 9/1996 | Chen et al. . | |
| 5,563,714 | * 10/1996 | Inoue et al. | 386/66 |
| 5,647,047 | * 7/1997 | Nagasawa | 386/52 |
| 5,684,918 | 11/1997 | Abecassis | 386/46 |
| 5,703,655 | 12/1997 | Corey et al. | 348/468 |

FOREIGN PATENT DOCUMENTS

| 1294250 | 11/1989 | (JP) . |
| 6150624 | 5/1994 | (JP) . |

OTHER PUBLICATIONS

Ide et al., National Technical Report vol. 41, No. 2, pp. 152–159, Apr. 1995, "DVC Standard for Consumer–Use Digital VCR's" (Partial Translation).

The coding Technique of Moving Picture for Digital Storage Media by Yasuhiro Yamada and Motoharu Ueda (JVC Cental R&D Center, Kurihama), Television Academic Journal, vol. 45, No. 7, pp. 807–812, 1991.*

* cited by examiner

Primary Examiner—Huy Nguyen
(74) Attorney, Agent, or Firm—Renner, Otto, Boisselle & Sklar

(57) ABSTRACT

A recording and reproducing apparatus for recording and reproducing hybrid data, including at least one of video data, audio data and additional data, onto a recording medium is provided. The recording and reproducing apparatus includes: a bus for transmitting data therethrough; an interface for receiving the video data and the audio data and outputting these data to the bus; a text unit for generating text data and outputting the text data to the bus; a processor for receiving the video data, the audio data and the text data via the bus, generating the hybrid data from the video data, the audio data and the text data and outputting the generated hybrid data to the bus; a recording unit for receiving the hybrid data via the bus and recording the hybrid data onto the recording medium; a reproducing unit for reproducing the hybrid data recorded on the recording medium; and an output unit for displaying the hybrid data reproduced by the reproducing unit.

6 Claims, 19 Drawing Sheets

RECORDING AND REPRODUCING APPARATUS

This is a division of copending application Ser. No. 08/674,584, filed Jul. 2, 1996.

BACKGROUND OF THE INVENTION

1. Field of the Invention

The present invention relates to an apparatus for recording and reproducing data representing video, data representing sound, and other auxiliary data onto/from a disk medium, a tape medium, or a recording and reproducing apparatus which can efficiently perform an editing operation and establish a network connected with an external system.

2. Description of the Related Art

As recording and reproducing apparatuses for magnetically recording and reproducing video and sound, tape type recording and reproducing apparatuses using a tape shaped medium, disk type recording and reproducing apparatuses using a disk shaped medium and the like are currently known.

As tape type recording and reproducing apparatuses, video tape recorders (hereinafter, abbreviated as "VTRs"), data streamers and the like are known. As disk type recording and reproducing apparatuses, magneto-optical disk apparatuses (hereinafter, abbreviated as "MOs"), hard disk drive apparatuses (hereinafter, abbreviated as "HDDs"), floppy disk drive apparatuses (hereinafter, abbreviated as "FDDs") and the like are known.

On the other hand, a VTR conformable to DVC standard (hereinafter, simply referred to as a "DVC type VTR) is known as an exemplary digital recording and reproducing apparatus. The DVC standard is described, for example, in the magazine "National Technical Report", Vol. 41, No. 2, April 1995, pp. 152–159.

In a DVC type VTR, a recording signal is composed of 10 tracks per period corresponding to one frame of a video. On one track, there are the following four sectors: (1) an ITI (insert and track information) sector; (2) an audio sector; (3) a video sector; and (4) a sub-code sector.

An audio sector and a video sector are regions for recording data representing sound and data representing video, respectively thereon, and are respectively provided with an audio AUX and a video AUX as regions for recording auxiliary data thereon.

As sub-codes or data other than sound and video, the following information is recorded in the sub-code sector. In an ID section, an INDEX-ID (a marker for searching for a program), a PPII (a marker for searching for an image), a SKIP ID (a marker indicating a skip start position), an absolute track number (a track number indicating the position from the recording start track at the beginning of a tape) and the like are provided as recording information.

On the other hand, in a data section of the sub-code sector, a Title Time Code (a time code representing a recording time from the recording start track at the beginning of a tape), a Rec Data (a time code representing a recording date (month/day/year)) and a Rec Time (or a time code representing a recording time (hour/minute/second)) can be recorded.

In the DVC method, video and sound recorded on a tape can be searched for at a high speed by using these kinds of information.

However, in a conventional DVC type VTR, video data, audio data and auxiliary data are recorded on a tape. Accordingly, such a VTR has a problem in that the contents of a video program recorded thereon cannot be rapidly identified at substantially real time.

Moreover, a DVC type VTR also has a problem in that a user like a reporter, a journalist, an editor or a director cannot efficiently record a long descriptive sentence for a news item or the like as text data or graphic data and then rapidly search for video, sound and the like which are ordinarily searched for by a keyword search or the like.

On the other hand, a team (or reporting crew) reporting an event or an accident for a TV program ordinarily consists of a plurality of members, including reporters informing of the situation and video cameramen. In general, such a reporting crew needs a large number of members. If character data can be recorded and communicated simultaneously with video and sound for reporting more accurate situation of the spot where the materials are collected, then the efficiency of a news reporting system can be improved.

SUMMARY OF THE INVENTION

According to the present invention, a recording and reproducing apparatus for recording and reproducing hybrid data, including at least one of video data, audio data and additional data, onto a recording medium is provided. The recording and reproducing apparatus includes: a bus for transmitting data therethrough; an interface for receiving the video data and the audio data and outputting these data to the bus; a text unit for generating text data and outputting the text data to the bus; a processor for receiving the video data, the audio data and the text data via the bus, generating the hybrid data from the video data, the audio data and the text data and outputting the generated hybrid data to the bus; a recording unit for receiving the hybrid data via the bus and recording the hybrid data onto the recording medium; a reproducing unit for reproducing the hybrid data recorded on the recording medium; and an output unit for displaying the hybrid data reproduced by the reproducing unit.

In one embodiment, the recording and reproducing apparatus further includes a VTR interface which is connected to the bus and receives a data stream having a data rate four times as high as a rate of data output by a digital VTR in a normal reproducing operation.

In another embodiment, the recording and reproducing apparatus further includes a VTR for outputting a data stream at a data rate four times as high as a data rate in a normal reproducing operation.

In still another embodiment, the interface outputs the video data and the audio data at an interval which is N (where N is a natural number) times as long as a unit frame period of the video data.

In still another embodiment, the additional data includes at least one of a time code and a sub-code which are defined in conformity with a digital VTR standard.

In still another embodiment, the recording and reproducing apparatus further includes means for storing the text data in a region which is used for recording the additional data of the hybrid data thereon and corresponds to a plurality of frames, in a case where the text data is not able to be recorded in a region which is used for recording the additional data of the hybrid data thereon and corresponds to one frame.

In still another embodiment, the recording and reproducing apparatus further includes means for performing a search operation by using the text data as key words.

In still another embodiment, the recording and reproducing apparatus further includes means for determining whether or not a data amount of the text data exceeds a recordable data amount of the recording medium.

In still another embodiment, the recording and reproducing apparatus further includes means for determining whether or not it is possible to seamlessly reproduce a signal from the recording medium.

In still another embodiment, the hybrid data to be recorded is recorded in respectively different regions on the recording medium such that a signal is able to be reproduced seamlessly from the recording medium.

In still another embodiment, the recording and reproducing apparatus further includes a communication interface which is connected to the bus and communicates with an external device, thereby transmitting the hybrid data to the external device or receiving the hybrid data from the external device.

In still another embodiment, the hybrid data is transmitted in a form of either one of a PES packet and a transport packet which are defined in conformity with an MPEG standard.

In still another embodiment, a data rate of the hybrid data transmitted between the communication interface and the external device is higher than a rate of data output by a digital VTR in a normal reproducing operation.

In still another embodiment, the communication interface further includes means for converting a data rate such that a data rate on a side of the bus becomes different from a data rate on a side of the external device.

In still another embodiment, the recording and reproducing apparatus further includes means for receiving the hybrid data transmitted through the bus and converting the hybrid data such that the hybrid data conforms to application interface (API) specifications corresponding to an external application.

In still another embodiment, the recording and reproducing apparatus further includes a display for displaying the video data thereon, the display selectively displaying a part of frequency components of the video data.

In still another embodiment, the recording and reproducing apparatus further includes means for adding data representing attributes to the hybrid data.

In still another embodiment, the recording and reproducing apparatus further includes: means for separating audio data from the hybrid data; means for recording the hybrid data onto the recording medium; means for recording second audio data, which is an output of the means for separating audio data, onto the recording medium; means for reproducing the hybrid data recorded on the recording medium; and means for reproducing the second audio data.

In still another embodiment, the recording and reproducing apparatus further includes stream control means for simultaneously separating the audio data from the hybrid data; recording the hybrid data onto the recording medium; recording the second audio data, which is an output of the means for separating audio data, onto the recording medium; reproducing the hybrid data recorded on the recording medium; and reproducing the second audio data.

In still another embodiment, the recording and reproducing apparatus further includes stream control means for simultaneously separating N-times-higher (where N is an integer larger than 1) audio data from N-times-higher hybrid data which is input at a data rate N times as high as a normal rate; recording the N-times-higher hybrid data onto the recording medium; recording N-times-higher second audio data, which is an output of the means for separating N-times-higher audio data, onto the recording medium; reproducing the hybrid data recorded on the recording medium; and reproducing the second audio data.

In still another embodiment, the recording and reproducing apparatus further includes signal processing means for producing new hybrid data from the reproduced hybrid data and the reproduced second audio data.

In still another embodiment, the recording and reproducing apparatus further includes: audio data input means for inputting data having the same data form as a data form of the second audio data; and means for recording an output of the audio data input means onto the recording medium.

In still another embodiment, the recording and reproducing apparatus further includes means for outputting the second audio data recorded on the recording medium to an external apparatus.

In still another embodiment, the means for separating audio data from hybrid data further includes: means for separating audio data, in which a series of audio data corresponding to a predetermined period is rearranged in accordance with a predetermined rule, from the hybrid data; and means for further converting the separated audio data into temporally serial second audio data.

In still another embodiment, the recording and reproducing apparatus further includes means for converting the second audio data reproduced from the recording medium into the hybrid data.

In still another embodiment, the conversion means further includes a processor and a memory for performing software processing.

In still another embodiment, a variation of a level of a sampling value of the second audio data reproduced from the recording medium; a conversion of a sampling frequency; a conversion of a sampling number within a video frame period; and mixing, rearranging of a time axis and editing of the plurality of second audio data are performed by software processing of a computer using a processor and a memory.

According to another aspect of the present invention, a recording and reproducing apparatus for recording and reproducing hybrid data, including at least one of video data, audio data and additional data, onto a recording medium is provided. The recording and reproducing apparatus includes: a tape recording/reproducing unit for recording and reproducing the hybrid data by using a tape medium as the recording medium; a disk recording/reproducing unit for recording and reproducing the hybrid data by using a disk medium as the recording medium; a recording rate conversion unit for recording at a rate different from a normal recording rate; a reproducing rate conversion unit for reproducing at a rate different from a normal reproducing rate; and a first interface unit for packetizing the hybrid data output from the reproducing rate conversion unit and inputting/outputting the packetized hybrid data.

In one embodiment, the recording and reproducing apparatus further includes a recording/reproducing mode control unit for controlling operation modes of the tape recording/reproducing unit and the disk recording/reproducing unit.

In another embodiment, the recording and reproducing apparatus further includes a signal processing unit for receiving the video data, the audio data and the additional data and outputting these data as the hybrid data. The signal processing unit includes: a coding/decoding unit for coding or decoding in accordance with an input/output signal; an error correction coding/decoding unit for performing error correction coding or error correction decoding on signals which are recorded and reproduced by the tape recording/ reproducing unit and the disk recording/reproducing unit, respectively; a signal transmission unit for bidirectionally transmitting a signal between the coding/decoding unit and the error correction coding/decoding unit; a control unit for controlling a transmission direction of the signal transmission unit; and a control signal generation unit for generating a control signal for the control unit in accordance with a mode control signal output from the recording/reproducing mode control unit.

In still another embodiment, the coding/decoding unit includes: a multiplexing section for multiplexing input data on a time axis, thereby generating a single data stream; a shuffling section for shuffling the data stream; a compression section for compressing on the time axis data output from the shuffling section; a deshuffling section for deshuffling data output from the compression section; and a signal coding/decoding section for coding data output from the deshuffling section.

In still another embodiment, the recording and reproducing apparatus further includes a second interface unit for adding editing control information for the tape recording/ reproducing unit or the disk recording/reproducing unit to data output from the first interface unit.

In still another embodiment, the recording and reproducing apparatus further includes a third interface unit for adding universal packetizing information conformable to a transport standard for an MPEG system to data output from the second interface unit.

Hereinafter, the functions or effects to be attained by the present invention will be described. By utilizing the above-described configuration, the recording and reproducing apparatus of the present invention can efficiently record data on a recording medium; search for a desired video at a high speed from the recording medium; effectively display text data associated with the video; and be connected to a network and instantaneously input and edit videos output from a plurality of recording and reproducing apparatuses, thereby considerably improving editing efficiency.

In addition, the recording and reproducing apparatus of the present invention under the above-described configuration can perform a normal reproducing operation, a trick-play reproducing operation and the like of a previously recorded signal, while recording a signal (e.g., a video signal) which is input in real time, and can efficiently perform signal transmission and editing operations.

Furthermore, the recording and reproducing apparatus of the present invention under the above-described configuration can packetize a video signal, an audio signal and data, thereby efficiently transmitting data.

Thus, the invention described herein makes possible the advantage of providing a recording and reproducing apparatus which can record and communicate information which cannot be communicated in the form of video and sound (e.g., a detailed comment) by recording text data or graphic data in a data vacant region of each frame; search for a video at a high speed by using the recorded text data or the like as a keyword; and considerably improve editing efficiency by instantaneously inputting and editing the output images of a plurality of DVC type VTRs.

This and other advantages of the present invention will become apparent to those skilled in the art upon reading and understanding the following detailed description with reference to the accompanying figures.

DESCRIPTION OF THE PREFERRED EMBODIMENTS

Figure 1:
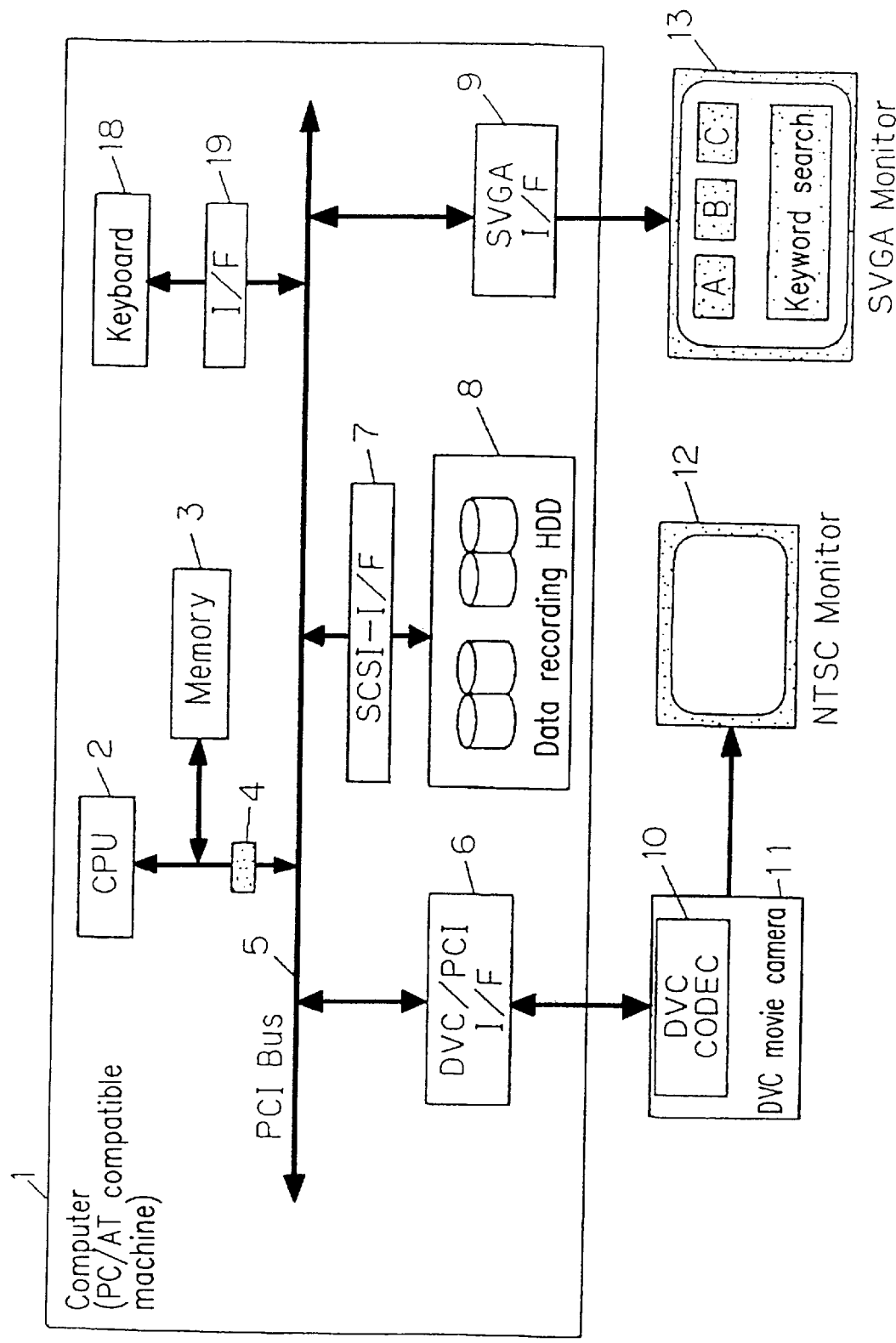
FIG. 1 is a diagram showing a system configuration for a recording and reproducing apparatus in a first example of the present invention.

Hereinafter, the embodiments of the recording and reproducing apparatus according to the present invention will be described with reference to the accompanying drawings, in which the same reference numerals denote the same components throughout the following examples.

EXAMPLE 1

FIG. 1 is a diagram showing a system configuration for a recording and reproducing apparatus in a first example of the present invention. In FIG. 1, the reference numeral 2 denotes a CPU; 3 denotes a memory for temporarily storing data output from the CPU 2; and 4 denotes an interface (I/F)

between the CPU 2 and a PCI bus 5. A DVC movie camera 11 includes a DVC-CODEC (or a signal source for a DVC) 10. Herein, the "CODEC" of the DVC-CODEC 10 is an abbreviation of a "COder/DECoder" and converts a signal which represents an image and is output from a charge coupled device (CCD) and a signal which represents a sound and is output from a microphone into digital signals conformable to the DVC standard. The "DVC" is an abbreviation of a "Digital Video Cassette". A "DVC movie camera" means a camera conformable to either an international standard for a digital VTR or an agreement issued by HD Digital VCR Conference. A digital signal which has been recorded by the DVC movie camera 11 in conformity with the DVC compression method (hereinafter, simply referred to as a "DVC signal") is transferred to a DVC/PCI-I/F (or a DVC/PCI interface) 6. Herein, the DVC signal is composed of compressed video data and audio data and auxiliary data (e.g., sub-codes). The video, sound and auxiliary data or outputs of the DVC-CODEC 10 can be viewed and listened to on an NTSC monitor 12.

In this specification, "hybrid data (or a hybrid signal)" refers to data obtained by mixing video, sound and data in such a manner that each of the video, the sound and the data corresponds to one frame. This hybrid data is a signal using one frame as a unit and corresponds to one still picture.

If a plurality of these frame-based hybrid data are assembled so as to correspond to N (N: an integer equal to or larger than 2) frames, then a moving picture, a sound or a long sentence text can be formed, and this resulting picture, sound or text is defined as an "event". By changing the reproduction order of the frames included in such an event, it is possible to form an event which can be reproduced at a high speed or slowly reproduced.

Moreover, by assembling various kinds of events, an assembly of events which is called a "title" can be formed.

In reproducing a title from a hard disk, the positions at which the events are recorded are not required to be successive. This is because, since a random access to the hard disk can be performed at a high speed, the hybrid data can be output successively.

The DVC/PCI-I/F 6 is attached to an extended slot of a PCI bus 5 of the computer 1. In-the first example, an IBM PC/AT compatible machine is used as the computer 1. Alternatively, a system may be configured using other computers (e.g., PC9801 series Macintosh).

The DVC signal output to the PCI bus 5 is input to a data recording HDD 8 via an SCSI-I/F 7 so as to be recorded thereon. Since the data amount of the DVC signal is about 120 kbytes per frame, a DVC signal corresponding to about ten minutes can be recorded in real time by using an HDD having a recording capacity of 2 Gbytes. In this example, an HDD is used as the medium for recording data thereon. However, the same effects can be attained if other recording media such as an MO or a PD (a kind of phase change type magneto-optical disk) are used. In performing the reproducing operation, the video, audio and data signals which have been recorded on the data recording HDD 8 follow a course opposite to that described above, so as to be viewed and listened to on the NTSC monitor 12.

In order to realize a recording operation in which text data is recorded in parallel with recording the DVC signal onto the data recording HDD 8 seamlessly without skipping any frames, character data is recorded by the computer 1 onto a vacant region of a sub-code or video auxiliary data VAUX in each frame. As operating systems (OSs) for the computer 1, MS-DOS, Windows 3.1, Windows NT, Windows 95, UNIX (e.g., MARC, Linux, etc.) and the like can be used. As descriptor languages for control software for controlling the computer 1, an assembly language, a C language, a C++ language and the like can be used. Furthermore, any languages other than these can also be used.

Figure 2:
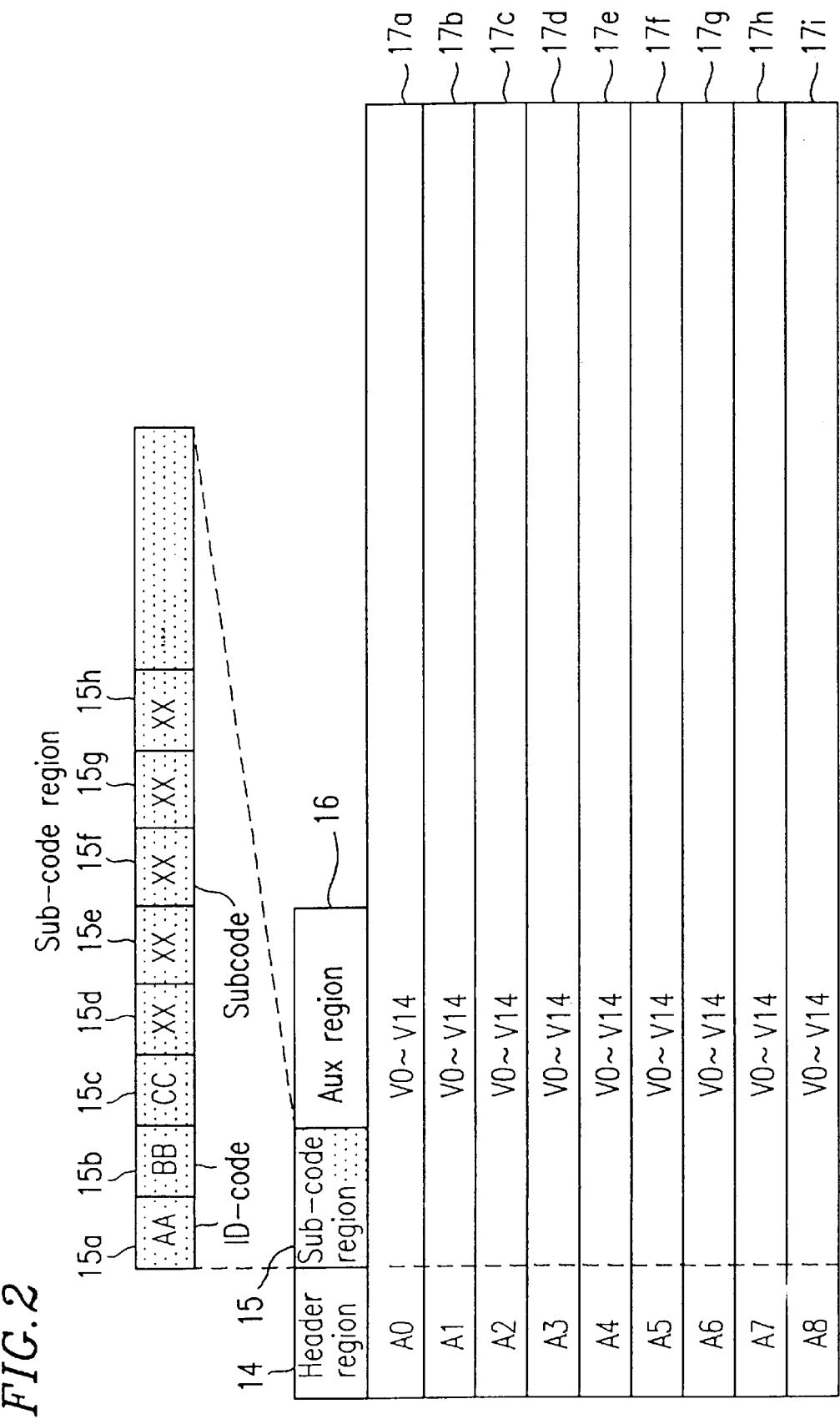
FIG. 2 shows exemplary sub-codes.

FIG. 2 shows exemplary sub-codes. Data corresponding to one frame of an image is recorded on 10 tracks on a magnetic tape. For one track data, video data and audio data are recorded as data 17a to 17i, respectively. Regions A0 to AB are audio data, while regions V0 to V14 are video data. At the beginning of one track data, a header region 14, a sub-code region 15 and an AUX region 16 are formed. Assuming that characters corresponding to 60 bytes (i.e., 30 Japanese fullsize characters or 60 alphanumeric half-size characters) are input/output per frame (e.g., in the case of NTSC, one frame: one-thirtieth [sec.]), text data corresponding to 900 Japanese full-size characters can be recorded per second (or a period corresponding to 30 frames in the case of NTSC). In the case of alphanumeric characters, the recordable number of characters is doubled, that is to say, text data corresponding to 1800 characters can be recorded.

In FIG. 2, a part of the data in the sub-code region 15 are represented by hexadecimal numbers. In the first block, IDs corresponding to two bytes are represented as "AA" and "BB"; "reserved" corresponding to one byte is represented as "CC"; and modifiable information corresponding to five bytes is represented as "xx", "xx", "xx", "xx" and "xx". The above-described text data can be recorded in these five byte areas 15d to 15h.

This function allows a reporter or a journalist to record comments on the video on the video recording spot and then transmit both of these to a broadcasting station. In a case where a cameraman takes a video using a tape-type or a disk-type DVC movie camera and records characters in a data recording region in the video program, if this function is fully utilized, an efficient transmission of the video and the report manuscript to the broadcasting station can be made by the individual. In the above description, data composed of sub-codes, VAUX, etc. defined by the DVC standard are assumed to be dealt with. Alternatively, data which is defined in a so-called D-VHS (VHS which can record digital data) and has a compatibility with a VHS may also be dealt with.

Figure 3:
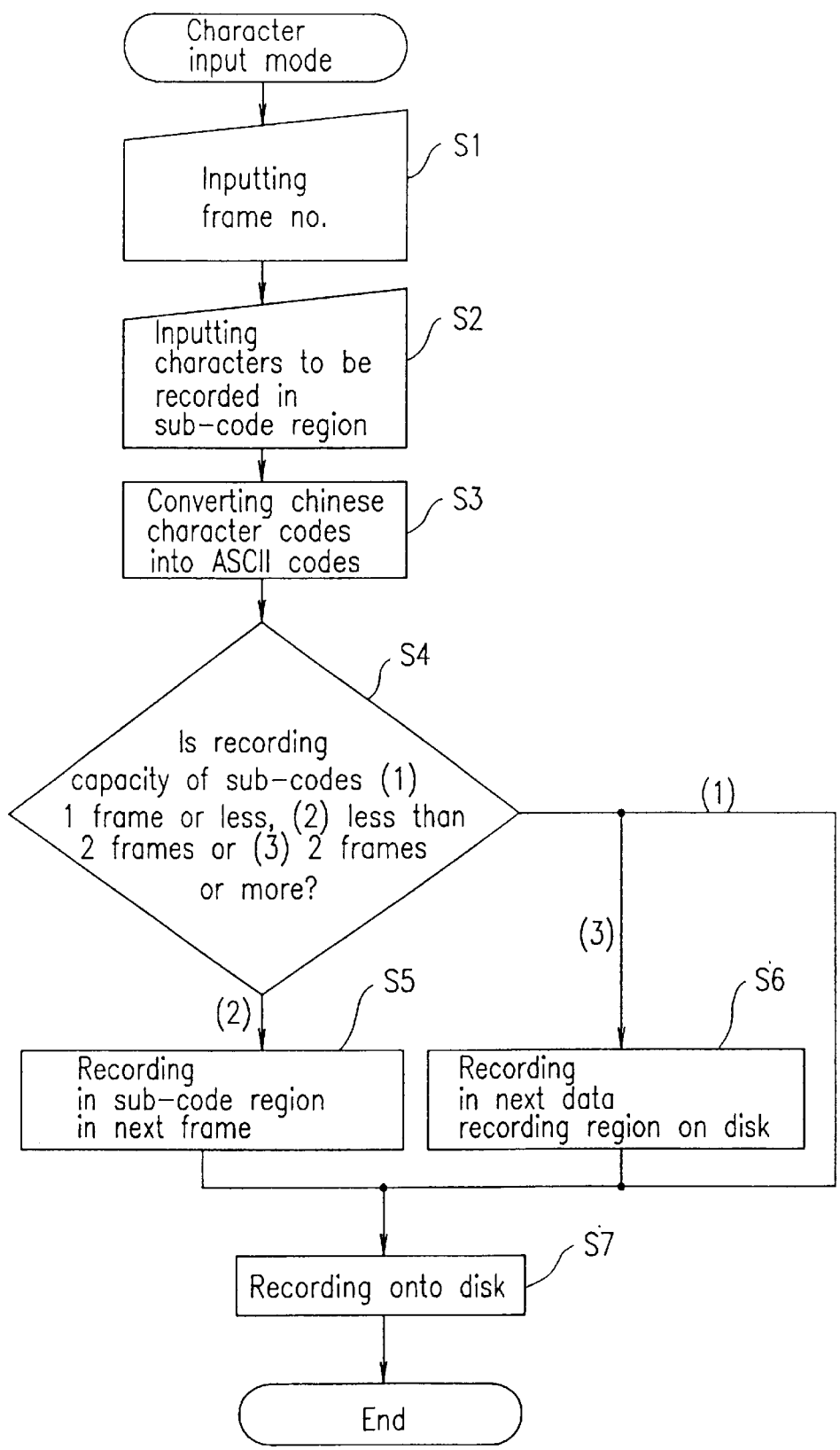
FIG. 3 is a flow chart illustrating the respective steps for inputting characters and rewriting the sub-codes.

FIG. 3 is a flow chart illustrating the respective steps for inputting characters and rewriting the sub-codes. In software implementing the first example, a management number for a top frame in a video program is input (S1). Next, at S2, characters to be recorded in the sub-code region are input. At S3, the chinese character codes of the input characters are converted into ASCII codes. At S4, the control branches depending upon whether the capacity of the data to be recorded as sub-codes is (1) one frame or less, (2) more than one frame and less than two frames or (3) two frames or more. In the cases of (1), (2) and (3), the control jumps to S7, S5 and S6, respectively. At S5, the converted codes are recorded in the sub-code region in the next frame. At S6, the converted codes are recorded in a text data recording region on the disk. Recording onto the disk is finished at S7. By performing the above-described steps, the text information can be recorded in the sub-code region.

For example, in the case of inputting nine alphabetical characters "Panasonic" into one frame by using a keyboard, these characters are automatically recorded at sub-code rewriting positions in the HDD. In addition, if a desired frame number is input through the keyboard of the computer 1, the text data of the desired frame can be displayed.

Characters corresponding to 1200 bytes can be recorded in twenty frames of a video program. In the case of recording a sentence corresponding to 1000 bytes in these frames, the sentence is automatically distributed to and recorded at the sub-code rewriting positions in the HDD. In this way, if the number of characters is too large to be recorded within one frame, the extra characters are automatically recorded in the next frame. Whether or not a comment sentence covers two frames or more is determined depending upon whether the last character recorded in the character region in the subcode region is a blank or not, for example. In the case where the last character is neither a blank nor a period, it is automatically determined that the sentence continues to the sub-code region in the next frame, so that the characters are continuously displayed.

On the other hand, characters corresponding to 600 bytes can be recorded in ten frames of a video program. However, in the case of recording a sentence corresponding to 1000 bytes, if the number of characters corresponds to 1000 bytes, for example, then characters corresponding to 400 bytes are left even when all of the recording region is utilized. In such a case, the remaining character data corresponding to 400 bytes or all the character data corresponding to 1000 bytes are recorded in a data region having a lower priority (for example, in a vacant region of the data recording HDD 8). Pointers representing the recording region and the character number of this character information are recorded in the sub-code region of the original video. In a similar manner, an enormous amount of character data such as that exceeding 10,000 characters can also be handled. If the character recording region becomes short, it is also possible to record the extra character data in an unrecorded region on an inner circumferential side of the HDD.

As described above, a method in which data is not recorded in the sub-code region in the next frame can also be used. In the case where the number of characters is too large to be recorded in the sub-code region, the character data may be recorded in the unrecorded region on the inner circumferential side of the HDD from the beginning. In the method for recording data in the recording region of the HDD other than the original subcode region, data is not necessarily recorded in an HDD in which video or the like is recorded but may be recorded in a separate HDD exclusively used for recording characters.

In performing a reproducing operation, text corresponding to the respective reproduced frames can be displayed on an SVGA monitor 13 for the computer 1 via an SVGA-I/F 9. The data may also be displayed on an NTSC monitor 12 by an overlay method or the like.

EXAMPLE 2

Referring to FIG. 1 again, a second example of the recording and reproducing apparatus according to the present invention will be described. In the second example, a search operation is performed by using subcode characters as key words.

In FIG. 1, the characters input through the keyboard 18 of the computer 1 are converted into ASCII codes or chinese character codes to be recorded in the sub-code region 15 in each frame. If the same codes as the ASCII codes or the chinese character codes of the key words A, B and C input as search key words are recognized as existing in the sub-code region 15, then the frame having the codes are determined to be a desired frame so as to be searched for. As a result, a desired video can be searched for at a high speed.

Moreover, only the sub-code characters in a desired frame can be selectively displayed by designating the characters to be displayed once for every predetermined number of frames or by inputting the number of the desired frame.

A method in which text data such as characters is recorded in the sub-code region 15 in each frame and used for a search operation has been described as an example. However, the same effects can also be attained even by a method in which text data is recorded in a vacant region for audio or video AUX data (VAUX).

EXAMPLE 3

Figure 4:
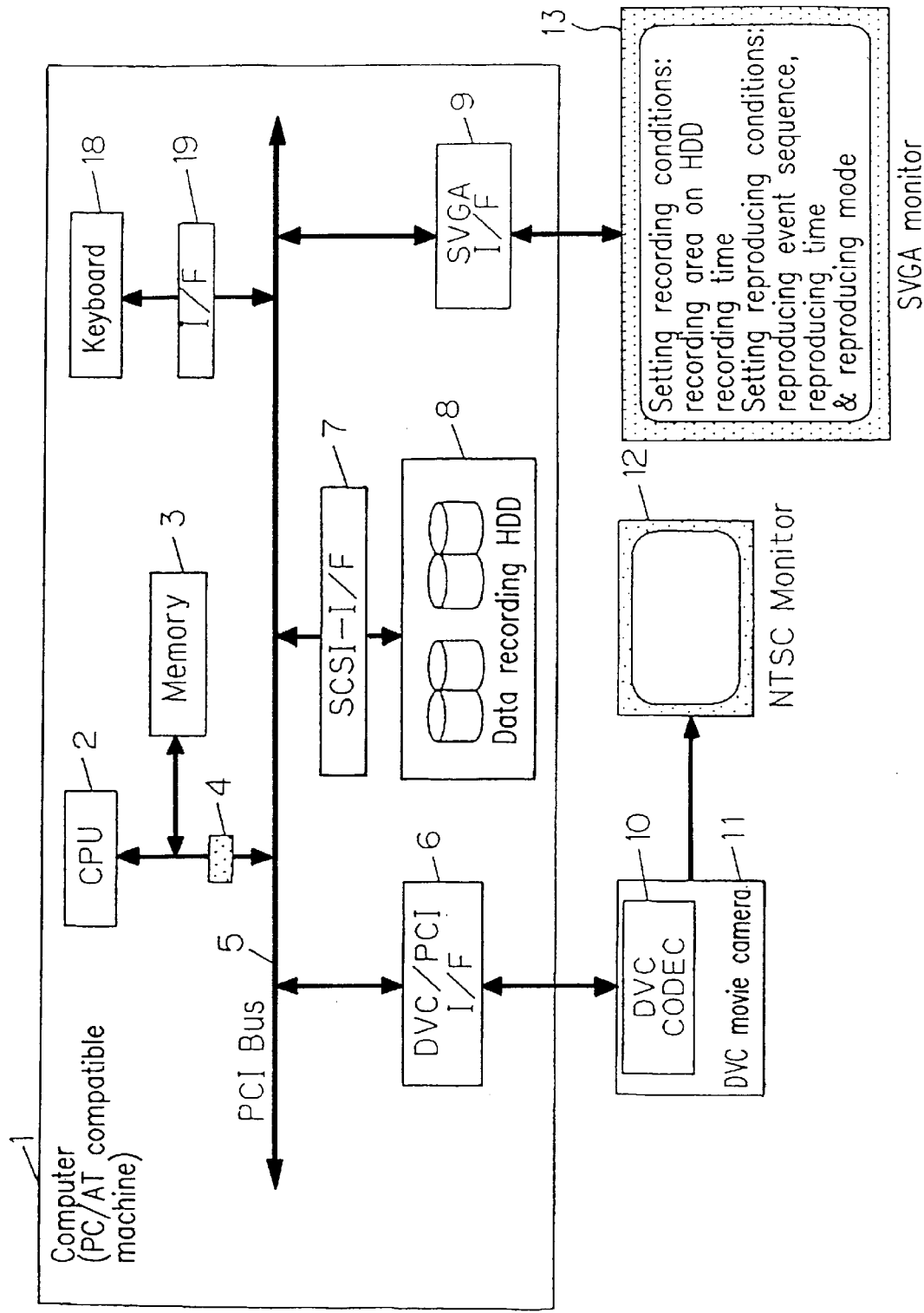
FIG. 4 is a diagram for illustrating a third example of the recording and reproducing apparatus according to the present invention.

FIG. 4 is a diagram, for illustrating a third example of the recording and reproducing apparatus according to the present invention, showing a system used for recording and reproducing a video signal such as a DVC signal onto/from a data recording HDD 8. As shown in FIG. 4, the fundamental system configuration in the third example is the same as that of the first example shown in FIG. 1. Before recording data onto the data recording HDD 8, various recording conditions such as the recording area on the HDD and the recording time are set using application software. On the other hand, before performing a reproducing operation, various reproducing conditions such as a reproducing event sequence, a reproducing time and a reproducing mode are set using application software.

In the reproducing mode, not only a normal one-time-fast (1×) reproducing operation, but also forward and backward n/32-times-faster slow reproducing operation (where n is an integer), m-times-faster high-speed reproducing operation (m is also an integer) and a still picture reproducing operation are realized. A slow reproducing operation of a video of high image quality is realized by controlling how many times a reproduced data set composing one frame is transferred to a DVC decoder. On the other hand, a high-speed reproducing operation is realized by a method in which reproduced data sets, each composing a 10-frame-later frame, are successively transferred to the DVC decoder in a 10-times-faster (10×) reproducing operation, for example. Furthermore, a still picture reproducing operation is realized by transferring a data set composing one frame to the DVC decoder until a preset time.

First, in the case of recording a DVC signal onto the data recording HDD 8, before recording the signal onto the data recording HDD 8, it is estimated whether or not the data amount of the DVC signal to be recorded is larger than the recordable capacity remaining in the data recording HDD 8. If a sufficient recording capacity cannot be secured, then a user is notified of the fact in the form of an "error" display or the like. A function for estimating and calculating the conditions for satisfying the recording conditions and notifying a user of the conditions is further provided on the application software.

In the case of reproducing video, sound and the like from the data recording HDD 8, the reproducing speed can be dynamically controlled in real time by utilizing the keyboard 18 of the computer 1 (for example, by operating the ten key or the like).

EXAMPLE 4

Figure 5:
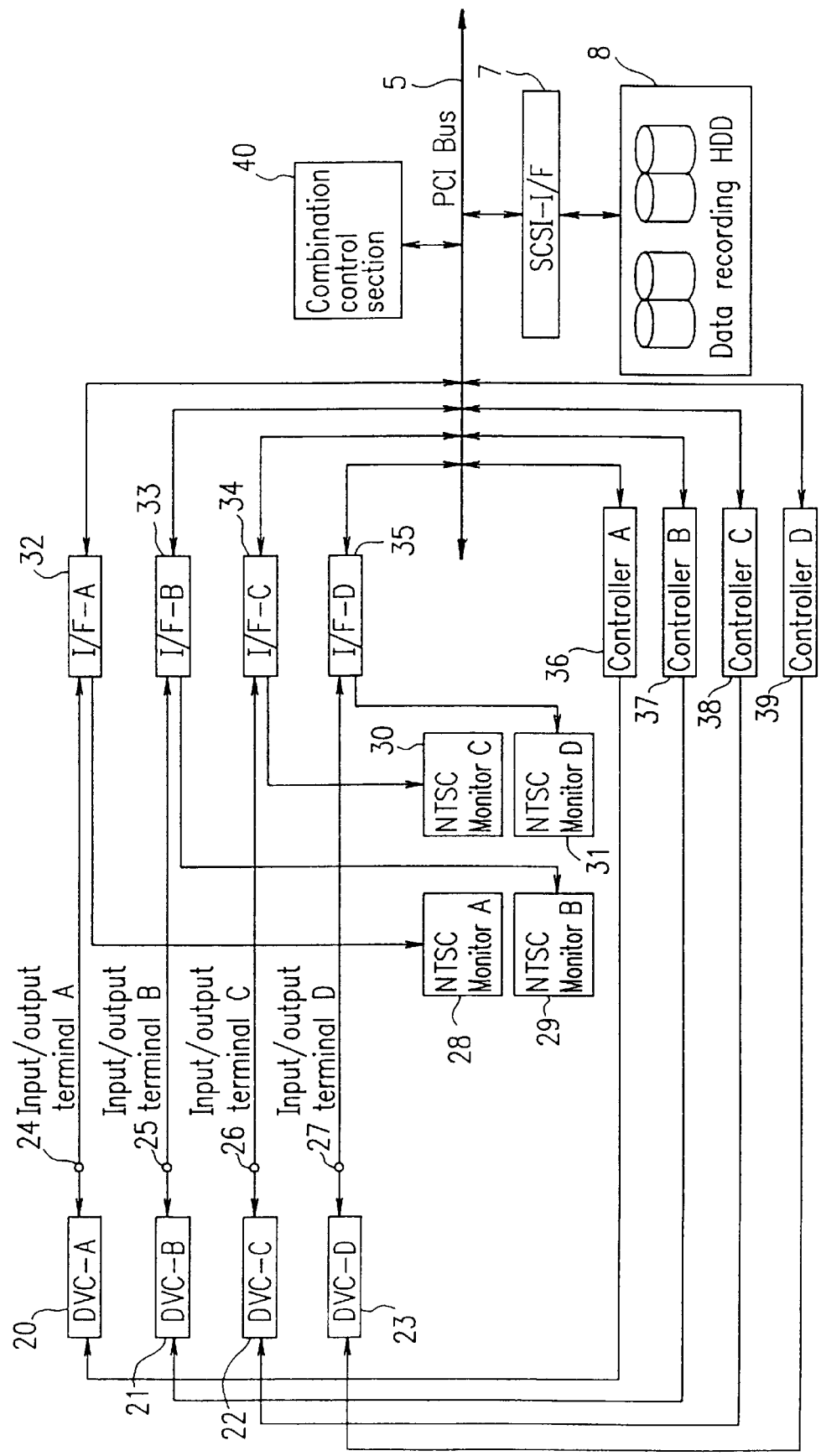
FIG. 5 is a block diagram illustrating a fourth example of the recording and reproducing apparatus according to the present invention.

FIG. 5 is a block diagram illustrating a fourth example of the recording and reproducing apparatus according to the present invention. In FIG. 5, a DVCA 20, a DVC-B 21, a DVC-C 22 and a DVC-D 23 are all DVC type digital VTRs; an I/F-A 32, an I/F-B 33, an I/F-C 34 and an I/F-D 35 are interfaces for converting the DVC signal so as to have the same form as that of a PCI bus signal and these interfaces correspond to the DVC/PCI interface 6 shown in FIG. 4; an NTSC monitor A 28 decodes and displays the DVC signal output from the DVC A 20 or the I/F-A 32; an NTSC monitor B 29, an NTSC monitor C 30 and an NTSC monitor D 31 display the respective DVC signals in a similar manner to the NTSC monitor A 28; and an audio signal can be monitored through an audio speaker (not shown) and data can be monitored on a display (not shown) of a computer.

The output signal of the DVC-A 20 is input to an SCSI-I/F 7 via the I/F-A 32 and the PCI bus 5 so as to be recorded onto the data recording HDD 8. The reproduced signal of the data recording HDD 8 follows the opposite course to be input to the DVC-A 20. The same is true of the DVC-B 21, the DVC-C 22 and the DVC-D 23.

The recording and reproducing operations of the input/output signals of the DVC-A 20, the DVC-B 21, the DVC-C 22 and the DVC-D 23 onto/from the data recording HDD 8 are controlled by a controller A 36, a controller B 37, a controller C 38 and a controller D 39, respectively.

In the case of inputting a DVC signal to a video server formed of the HDD, the reproducing operations are simultaneously performed in the DVC-A 20 to DVC-D 23; the output videos from the respective DVCs 20 to 23 are monitored on the respective NTSC monitors 28 to 31; and in the meantime, as soon as a video which is to be recorded onto the HDD is found, each controller rapidly performs processing for recording a desired DVC signal under the control of a combination control section 40. In this case, the controller automatically applies various attributes such as a time code and an event number to the recording signal, thereby introducing the signal into a database. The remaining components of the fourth example are the same as those of the first example.

In this way, it is possible to efficiently select a required DVC signal from a large number of cassettes, input the signal to the HDD server and record the signal thereon. Since the videos simultaneously output from four DVC-VTRs are monitored on the four NTSC monitors in parallel, a producer, a director, an editor or the like can efficiently record a video onto the HDD, so that editing efficiency can be considerably improved.

In this example, a system configuration using four VTRs is employed. However, the same effects can also be attained if two to ten VTRs are used. Also, a DVC is used as a VTR and a PCI bus is used as a universal bus. However, the same effects can be attained even if other VTRs or other universal buses are used.

Moreover, if the DVC-A 20 is used as the only DVC and the reproducing operation is performed at a speed four times as fast as that of a normal reproducing operation, then the bit rate itself of the data input to the PCI bus 5 is the same as that in the case of using four DVCs. Therefore, in such a case, it is also possible to perform an editing operation at a high speed by using the system shown in FIG. 5.

Figure 6:
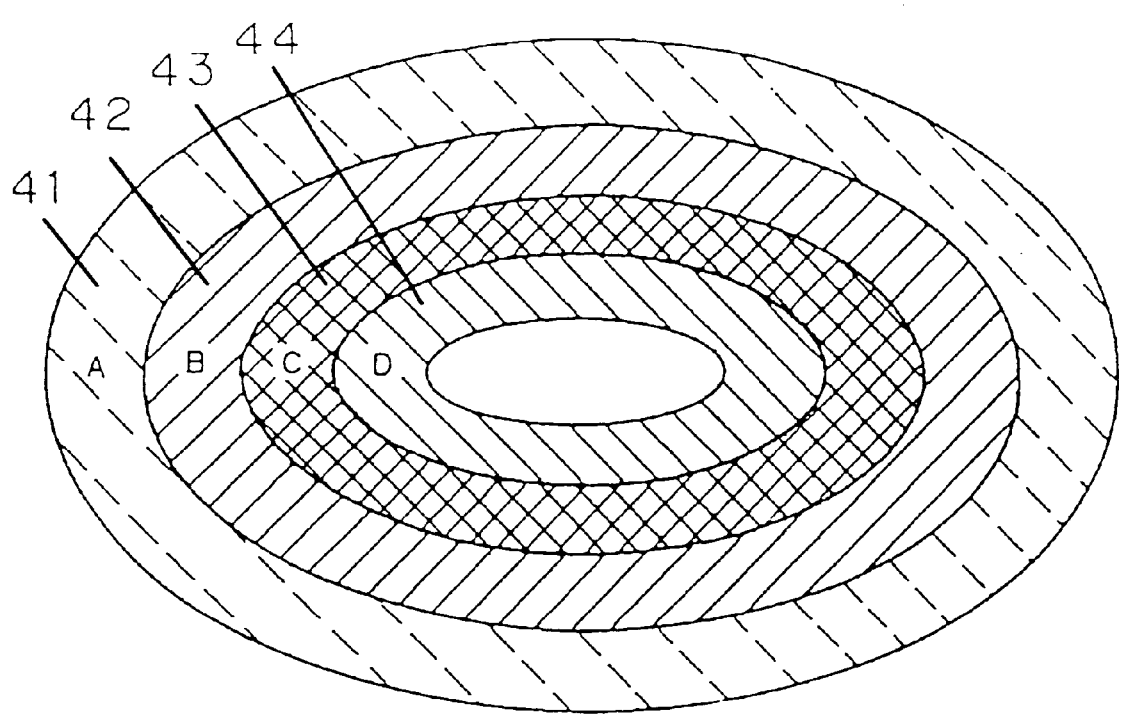
FIG. 6 shows the recording areas of the data recording HDD 8 used in the fourth example of the recording and reproducing apparatus according to the present invention.

FIG. 6 shows the recording areas of the data recording HDD 8 used in the fourth example of the recording and reproducing apparatus according to the present invention. The recording region of the data recording HDD 8 is divided into four recording areas, that is to say, a recording area A 41, a recording area B 42, a recording area C 43 and a recording area D 44. These areas are assigned beforehand for recording the DVC signals output from the four DVCs. In other words, the output signals of the four DVCs are respectively recorded in the corresponding recording areas. Since the recording region of the data recording HDD 8 is limited by dividing the region into four areas and assigning the areas to the respective output signals in this way, the resource management of the recording medium can be performed easily. In addition, since the recording areas of a plurality of events reproduced from one tape are logically continuous, various maintenances such as the data management in the data recording HDD 8 can be easily performed. Since four DVCs are used in the system configuration of this example, the recording region of the data recording HDD 8 is divided into four areas. However, even when the number of DVCs used in a system configuration is not four, the same effects can also be attained by dividing the recording region of the data recording HDD 8 into a number corresponding to the number of DVCs used in the system configuration.

On the other hand, in the case of using application software having excellent data management ability, a user can perform the recording and reproducing operations without any regard to the recording region of the data recording HDD 8 even by recording a DVC signal selected from the respective DVCs onto the data recording HDD 8 without dividing the recording region of the data recording HDD 8 so as to correspond to the respective DVCs.

EXAMPLE 5

Figure 7:
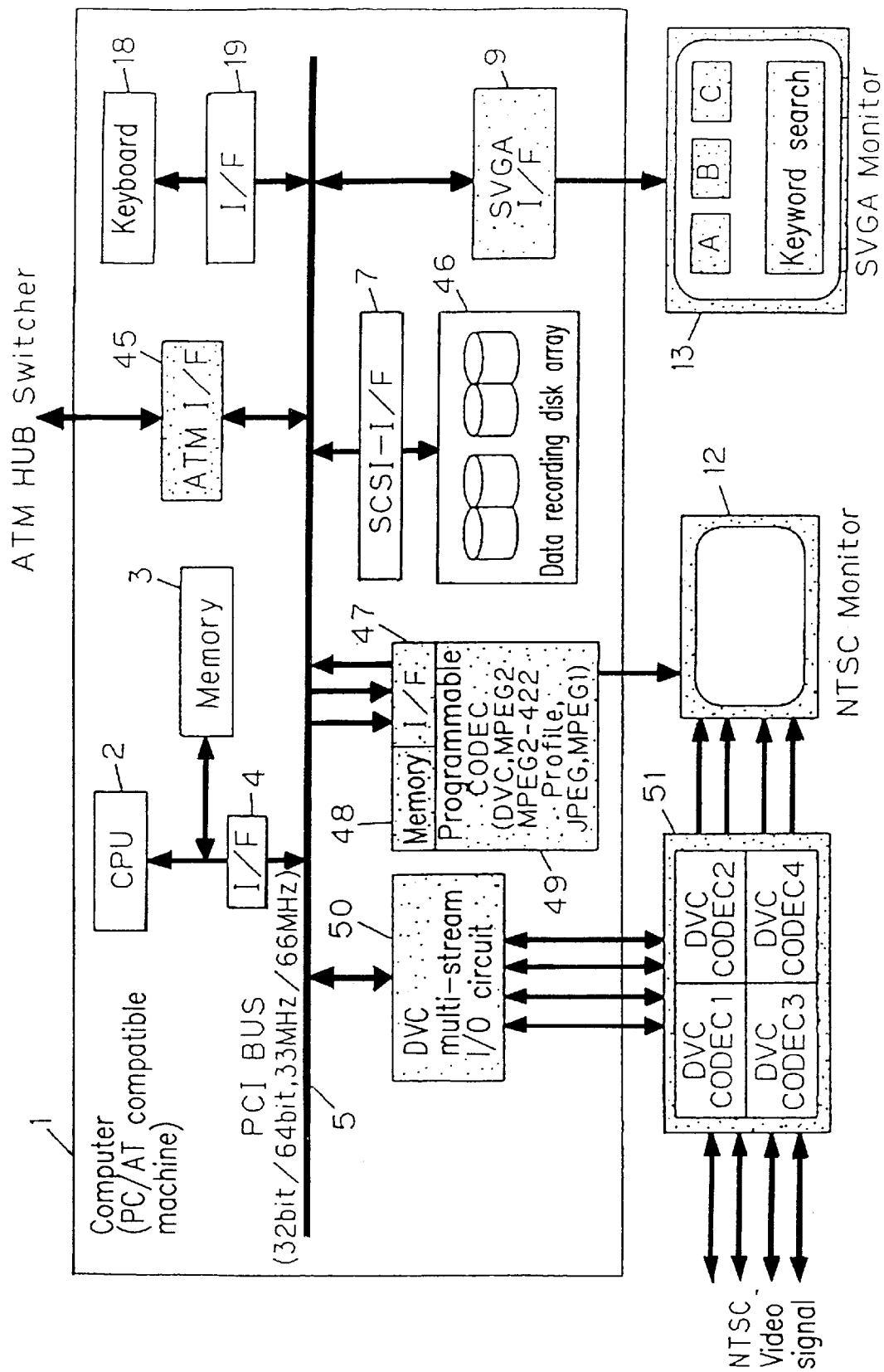
FIG. 7 is a block diagram illustrating a fifth example of the recording and reproducing apparatus according to the present invention.

FIG. 7 is a block diagram illustrating a fifth example of the recording and reproducing apparatus according to the present invention. In the system shown in FIG. 7, it is possible to realize an ATM transmission of a DVC signal, a programmable CODEC and an editing system in which an A/B roll can be performed. The fundamental operation in the fifth example is the same as that of the second example described with reference to FIG. 1.

A DVC multi-stream I/O circuit 50 is connected to the PCI bus 5. The input and the output of the four DVC signal streams which are input and output to/from four DVC CODECs 51 are controlled by control software. In this configuration, by converting the four DVC signals, which have been transmitted at a high speed, into four parallel DVC signals, it is possible to cope with a four-times-faster (4×) input.

In addition, an ATM interface 45 can transmit a DVC signal or the like which is transmitted on the PCI bus 5 to an external system at a high speed. It is noted that the ATM interface 45 can be formed of a communication interface based on a communication method defined by SMPTE259 standard or IEEE1394 standard.

Moreover, A/B roll editing can be performed by using an I/F 47, a memory 48, and a programmable CODEC 49. The programmable CODEC 49 has three CODECs therein and can generate a C-ch MPEG-2 output from an A-ch MPEG-2 422 profile input and a B-ch DVC signal input.

Figure 8:
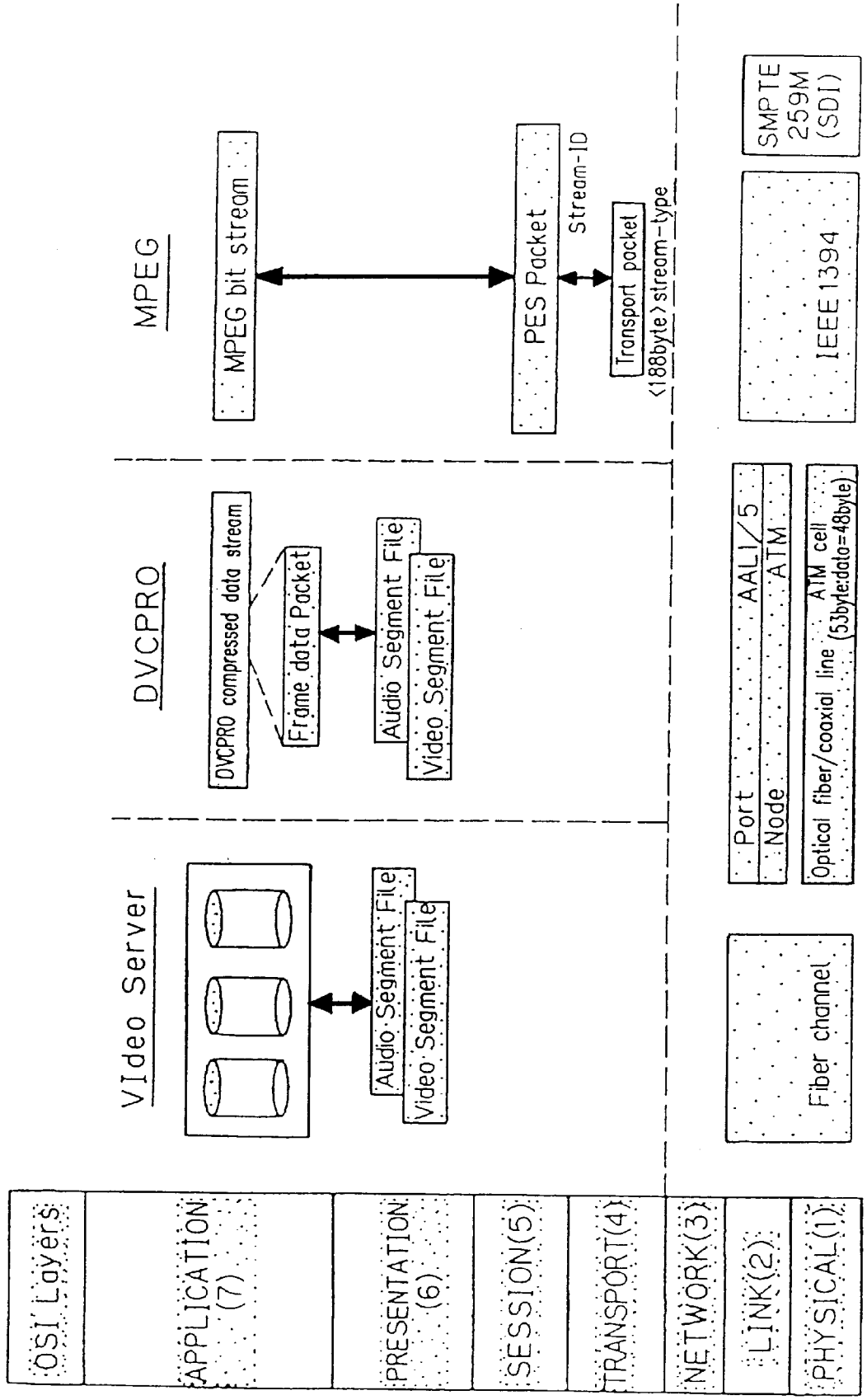
FIG. 8 schematically shows ATM transmission specifications for a DVC signal in the fifth example.

FIG. 8 schematically shows ATM transmission specifications for a DVC signal in the fifth example. In the fifth example, an ATM transmission signal is converted so as have the form of either one of a PES packet and a transport packet (TP) which are defined in an MPEG system and then transmitted. In FIG. 8, "DVCPRO" indicates the names of the standard, the data and the file which are dealt with in a business-use DVC conformable to the DVC standard. The frame processing rate of the transmission signal is a rate two to one hundred times as fast as a standard 1× frame reproduction rate. By using an MPEG system in this way, the coexistence of a DVC signal and an MPEG signal can be established in a wide range not only in an MPEG system but also in various systems associated with the MPEG system.

Figure 9:
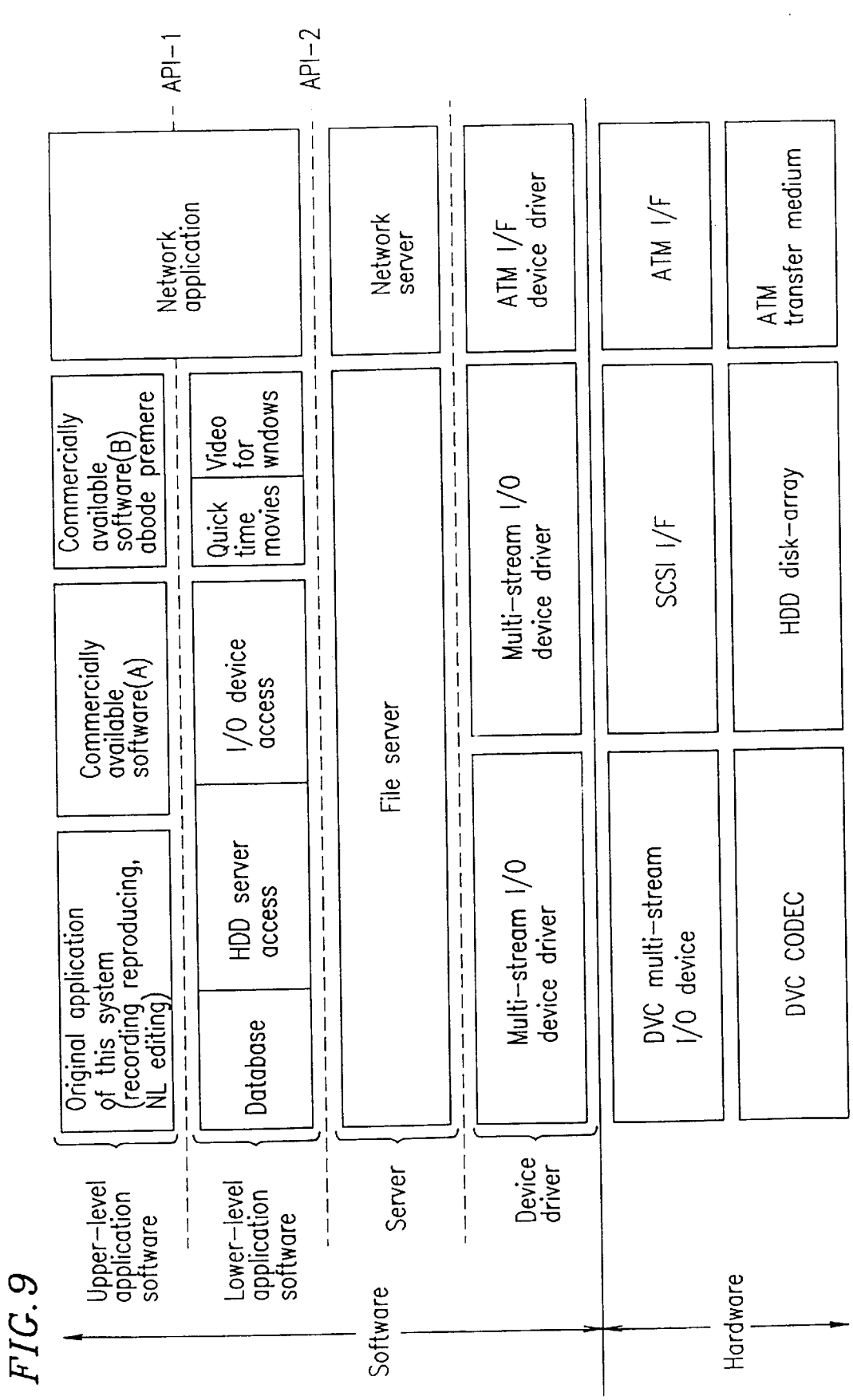
FIG. 9 schematically shows another exemplary configuration for hardware and software using the system shown in FIG. 7.

FIG. 9 schematically shows another exemplary configuration for hardware and software using the system shown in FIG. 7. According to the present invention, the application interface (API) for application software at an upper level and the API for application software at a lower level which is located as the lower layer thereof are defined and the software configuration is designed such that an original application produced according to the present invention can be used under an API having a commercially available and commonly used application. As a result, the performance of open system architecture of the recording and reproducing apparatus of the present invention can be secured. As the application, a data file form conforming to at least one of MPEG standard, JPEG standard, DVC standard, DV standard, DVCPRO standard, AVI standard and quick time movie standard can be dealt with.

In the above description, although the PCI bus was utilized as a universal data bus for a computer, the data bus is not limited to this data bus. For example, an EISA bus or a VL bus can be used.

EXAMPLE 6

Figure 11:
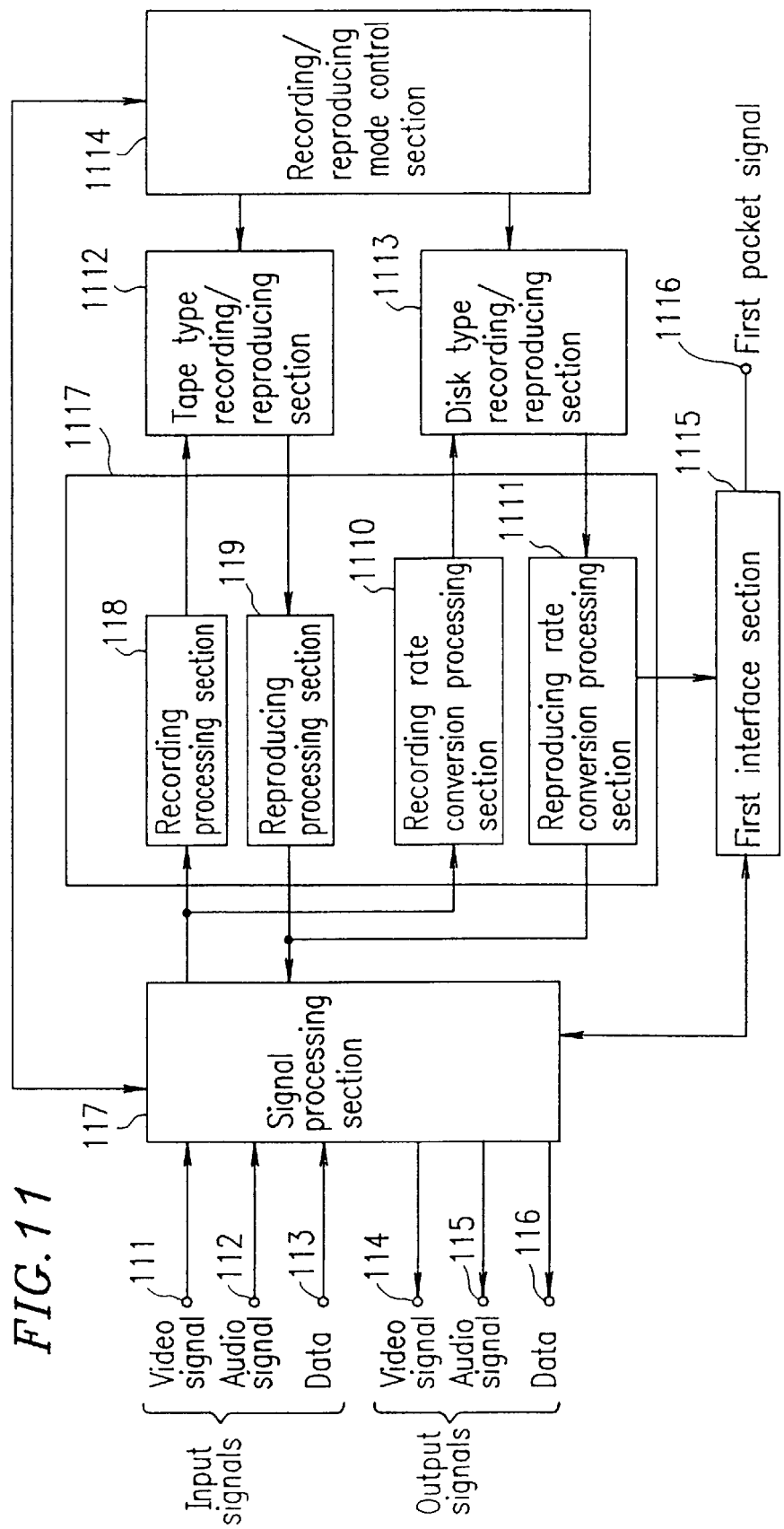
FIG. 11 is a block diagram illustrating a sixth example of the recording and reproducing apparatus according to the present invention.

FIG. 11 is a block diagram illustrating a sixth example of the recording and reproducing apparatus according to the present invention. In FIG. 11, the reference numeral 111 denotes a video signal input terminal; 112 denotes an audio signal input terminal; 113 denotes a data input terminal; 114 denotes a video signal output terminal; 115 denotes an audio signal output terminal; 116 denotes a data output terminal; 117 denotes a signal processing section; 118 denotes a recording processing section; 119 denotes a reproducing processing section; 1110 denotes a recording rate conversion processing section; 1111 denotes a reproducing rate conversion processing section; 1112 denotes a tape type recording/reproducing section; 1113 denotes a disk type recording/reproducing section; 1114 denotes a recording/reproducing mode control section; 1115 denotes a first interface section; 1116 denotes a first packet signal output terminal; and 1117 denotes a recording processing block section.

Referring to FIG. 11, the operation of the recording and reproducing apparatus having such a configuration will be described. First, the recording and reproducing operations on a tape shaped medium will be described.

The three types of input signals, i.e., a video signal input through the video signal input terminal 111, an audio signal input through the audio signal input terminal 112 and data input through the data input terminal 113 are subjected by the signal processing section 117 to rearranging, compression processing and the like if necessary; multiplexed on the time axis so as to be converted into one type of process signal; and then input to the recording processing section 118. The process signal is converted by the recording processing section 118 into a recording signal suitable for the tape shaped medium so as to be input to the tape type recording/reproducing section 1112. In accordance with a control signal supplied from the signal processing section 117, the recording/reproducing mode control section 1114 sets the tape type recording/reproducing section 1112 in a recording mode, whereby the recording signal is recorded by the tape type recording/reproducing section 1112 onto the tape-shaped recording medium.

In performing a reproducing operation, the recording/reproducing mode control section 1114 sets the tape type recording/reproducing section 1112 in a reproducing mode in accordance with a control signal supplied from the signal processing section 117 and the signal reproduced from the tape shaped medium by the tape type recording/reproducing section 1112 is input to the reproducing processing section 119. In the reproducing processing section 119, the reproduced signal is subjected to signal processing inverse to that performed by the recording processing section 118 (i.e., rearranging, expansion processing and the like), so as to become one type of process signal similar to the signal generated in the recording processing and then input to the signal processing section 117. In the signal processing section 117, the process signal is separated and converted into three types of signals, i.e., a video signal, an audio signal and data. Then, the three types of signals, i.e., the video signal, the audio signal and the data, are output through the video signal output terminal 114, the audio signal output terminal 115 and the data output terminal 116, respectively.

Hereinafter, the operation in the sixth example will be described in detail. In the sixth example of the recording and reproducing apparatus according to the present invention, first, the three types of signals, i.e., the video signal input through the video signal input terminal 111, the audio signal input through the audio signal input terminal 112 and the data input through the data input terminal 113 are transferred to the signal processing section 117, where the signals are processed to be one type of signal and then output. P13828 Next, an exemplary internal configuration and operation of the signal processing section 117 will be described in detail with reference to FIG. 12.

Figure 12:
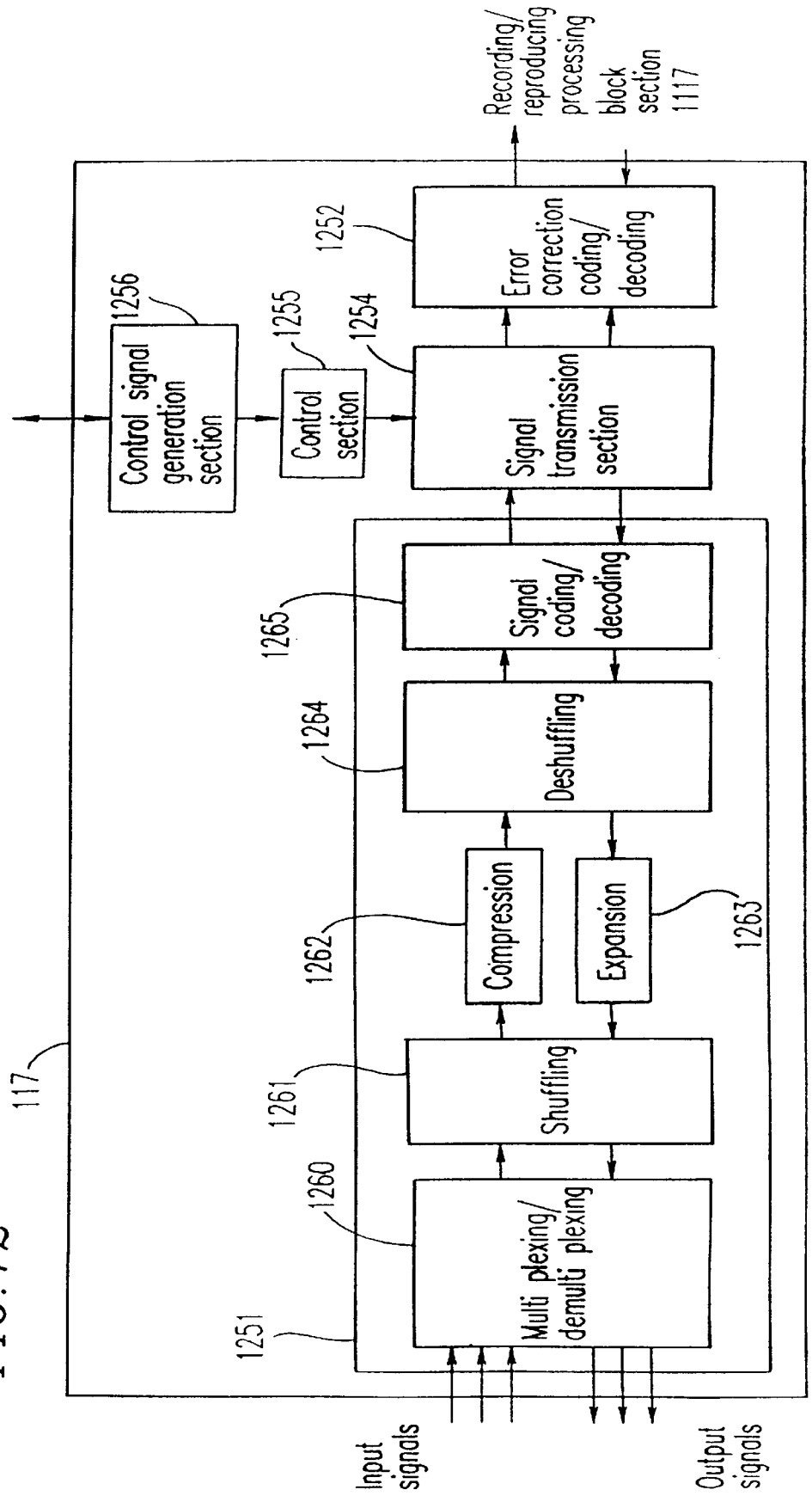
FIG. 12 is a block diagram showing an internal configuration for the signal processing section 117.

FIG. 12 is a block diagram showing an exemplary internal configuration for the signal processing section 117. First, the operation during recording will be described. The input video signal, audio signal and data are subjected by a coding/decoding section 1251 to various kinds of processing corresponding to the types of the signals. Thereafter, the output of the coding/decoding section 1251 is passed through a signal transmission section 1254; subjected to an error correction coding by an error correction coding/decoding section 1252 such that the error correction can be performed during the reproducing operation; and then output to the recording/reproducing processing block section 1117. The detailed process flow in the signal processing section 117 is as follows.

The three types of input signals are multiplexed on the time axis by a multiplexing/demultiplexing section 1260 to be one type of signal; shuffled by a shuffling section 1261 based on a predetermined unit; and then subjected to compression processing (e.g., decimation processing) by a compression section 1262. The compressed signal is deshuffled by a deshuffling section 1264 based on a predetermined unit. Then, the video signal and the audio signal other than the data are coded by a signal coding/decoding section 1265.

In reproducing a signal from the recording medium, the flow direction of the signal becomes opposite to that described above. The reproduced signal from the recording/reproducing processing block section 1117 is passed through the error correction coding/decoding section 1252 and the signal transmission section 1254 to be input to the coding/decoding section 1251. The signal input thereto is decoded by the signal coding/decoding section 1265; deshuffled by the deshuffling section 1264; and then output to the expansion section 1263. In the expansion section 1263, processing inverse to the processing performed in the compression section 1262 or expansion processing for decompressing the compressed signal on the time axis is performed. The decompressed signal is shuffled by the shuffling section 1261 and then the one type of signal is separated into the three types of signals by the multiplexing/demultiplexing section 1260 so as to be output.

Next, the processing for recording data onto the recording medium will be resumed. The output of the coding/decoding section 1251 is passed through the signal transmission section 1254 to be input to the error correction coding/decoding section 1252. The error correction coding/decoding section 1252 performs error correction coding processing such that a decoding error generated during the reproducing processing can be corrected. Then, the output of the error correction coding/decoding section 1252 is output to the recording/reproducing processing block section 1117.

A control signal generation section 1256 generates a first control signal for controlling the signal transmission section 1254 and a second control signal for controlling the recording/reproducing mode control section 1114. The first control signal is input to a control section 1255 and the transmission direction of the signal transmission section 1254 is controlled in accordance with this control signal, so that a bidirectional transmission, i.e., a transmission from the coding/decoding section 1251 to the error correction coding/decoding section 1252 and a transmission in the opposite direction, becomes possible. In addition, the second control signal output from the control signal generation section 1256 is output to the recording/reproducing mode control section 1114, so that the respective recording/reproducing modes of the tape type recording/reproducing section 1112 and the disk type recording/reproducing section 1113 are controlled in accordance with this second control signal.

Next, referring to FIG. 11 again, the output from this signal processing section 117 is subjected by the recording processing section 118 to various signal processing such that the output can be recorded by the tape type recording/reproducing section 1112 using a tape medium, and then input to the tape type recording/reproducing section 1112. The tape type recording/reproducing section 1112 records a coded signal on a tape shaped medium. A digital VTR such as a digital video cassette (DVC) is usable as an apparatus for the tape type recording/reproducing section 1112. The reproduced signal reproduced by the tape type recording/reproducing section 1112 is supplied through the reproducing processing section 119 to the signal processing section 117, in which the signal is separated into three types of signals to be output as output signals 114, 115 and 116.

In the case of recording/reproducing a signal onto/from a medium after converting the rate of the signal into an arbitrary or a predetermined recording rate, the signal output from the signal processing section 117 is subjected to a recording rate conversion (or a transfer rate conversion) by the recording rate conversion processing section 1110 and then output to the disk type recording/reproducing section 1113. The disk type recording/reproducing section 1113 records a coded signal on a disk shaped medium. For example, an HDD is usable as an apparatus for the disk type recording/reproducing section 1113.

In the case of reproducing recorded information at an equal rate or a different rate to/from the rate during the recording operation, the rate of the signal recorded by the disk type recording/reproducing section 1113 is converted into a desired reproducing rate by the reproducing rate conversion processing section 1111 and then the converted signal is passed through the signal processing section 117 to be output as the output signals 114, 115 and 116. Moreover, in order to packetize the output of the reproducing rate conversion processing section 1111, the output is transferred to the first interface section 1115, thereby outputting a first packet signal through the first packet signal output terminal 1116. Also, the output of the reproducing rate conversion processing section 1111 may be input to the signal processing section 117 via the first interface section 1115 and then fed back to the recording/reproducing processing block section 1117.

Each of the recording rate conversion processing section 1110 and the reproducing rate conversion processing section 1111 has a buffer memory therein, whereby the data rate of data to be input can be converted into the data rate of data to be output.

For example, data having an amount corresponding to one frame is input to the recording rate conversion processing section 1110 within one frame period. However, since the data bus inside the computer has a high data transmission rate, the time required for outputting the data becomes one-tenth of one frame period. In the same way, data having an amount corresponding to one frame is input to the reproducing rate conversion processing section 1111 within a time one-tenth as long as one frame period. However, one frame period is required for outputting the data therefrom.

By performing the above-described operation, while recording a signal, which is being input by a camera, both in the tape section and in the HDD section, it is possible to reproduce another event from the HDD at a 4× rate and output a 4× high-speed data packet onto a network.

A fundamental operation in this example is as described above. Next, the advantages obtained by operating the recording and reproducing apparatus of this example which is configured to include the first interface section 1115 as described above will be described with reference to FIG. 11.

One of the advantages of a disk medium over a tape medium is that a random access can be performed easily on the disk medium. The effects attained in this example by taking advantage of this feature will be described. When an input signal 111 of a video is output from the signal processing section 117, the signal is passed through the recording rate conversion processing section 1110, in which the rate of the signal can be converted into an arbitrary recording rate, and then transferred to the disk type recording/reproducing section 1113 so as to be recorded. Taking advantage of the random access ability, the disk type recording/reproducing section 1113 is configured such that a recorded video can be instantaneously searched for and edited with ease. For example, even when a video is reproduced at a speed equal to higher than a 1× normal reproducing speed or at a speed lower than the 1× normal reproducing speed, a desired recorded video signal can be located more easily as compared with a tape medium, so that editing time can be shortened.

By utilizing such a system configuration, while the input signals 111, 112 and 113 to be recorded are passed through the signal processing section 117, transmitted from the recording processing section 118 to the tape type recording/reproducing section 1112 and then recorded onto a tape shaped medium; it is possible to simultaneously reproduce a video signal or the like by the disk type recording/reproducing section 1113 and then output the reproduced signal to the first interface section 1115 via the reproducing rate conversion processing section 1111. It is also possible to retrieve the signal reproduced by the disk type recording/reproducing section 1113 from the signal processing section 117 as output signals 114, 115 and 116. As a result, parallel processing can be performed during the recording and reproducing operations.

In addition, the reproduced output may be retrieved through the first packet signal output terminal 1116 as a first packet signal which has been compressed by a method enabling a restoration for saving a recording region.

Such a recording and reproducing apparatus is applicable to a live baseball telecast, for example. In the case where a player has hit a home run, it is usual that the video representing the instant the home run was hit is broadcast as a slowly reproduced video. However, even while the video is slowly reproduced, the baseball play still goes on. Therefore, the situation possibly changes incessantly (e.g., the next player may hit a base hit) during this slow reproduction, and it is imaginable that the real-time situation has completely been changed.

In such a case, if only one conventional recording and reproducing apparatus is used, then a play actually occurring during this slow reproduction cannot be recorded. Accordingly, a plurality of recording and reproducing apparatuses are necessary for coping with such a situation. However, in this case, if the recording and reproducing apparatus of the present invention is used, then it becomes possible to perform simultaneous processing in the following mode (1) to (4), thereby preventing a case where one misses recording a video or a like case. It is noted that more kinds of modes can be set if a still picture mode, a pause mode and the like are also considered.

(1) Tape type recording/reproducing section: recording mode; and disk type recording/reproducing section: recording mode
(2) Tape type recording/reproducing section: recording mode; and disk type recording/reproducing section: reproducing mode
(3) Tape type recording/reproducing section: reproducing mode; and disk type recording/reproducing section: recording mode
(4) Tape type recording/reproducing section: reproducing mode; and disk type recording/reproducing section: reproducing mode In this example, the mode of the tape type recording/reproducing section 1112 which has been set by the recording/reproducing mode control section 1114 is assumed to be a recording mode. However, this mode has nothing to do with whatever mode is selected in the disk type recording/reproducing section 1113, i.e., a reproducing mode, a still picture mode, a pause mode or the like. Therefore, the tape type recording/reproducing section 1112 and the disk type recording/reproducing section 1113 can be independently set in any arbitrary mode selected from various modes.

EXAMPLE 7

Figure 10:
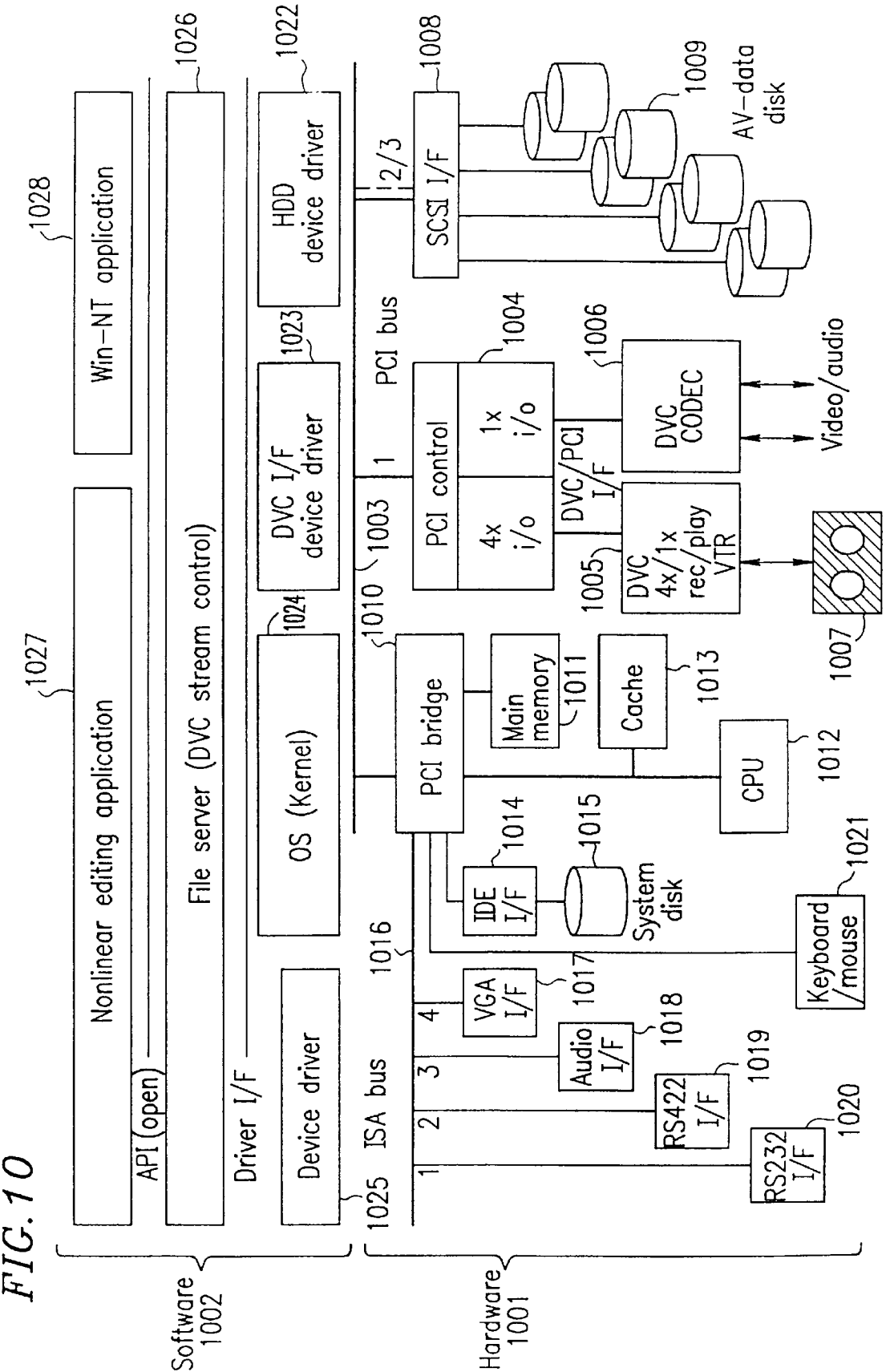
FIG. 10 is a diagram showing software and hardware configurations for a recording and reproducing apparatus in a seventh example of the present invention.

FIG. 10 is a diagram showing software and hardware configurations for a recording and reproducing apparatus in a seventh example of the present invention. In FIG. 10, the reference numeral 1001 denotes a hardware section; 1002 denotes a software section (a so-called AT compatible machine is formed by these two sections); 1003 denotes a PCI bus; 1004 denotes a PCI bus I/F card which inputs/outputs DVC compressed data to/from the PCI bus 1003 and is connected to the PCI bus 1003. The PCI bus I/F card 1004 is further connected to a DVC 4×/1× recording/reproducing VTR 1005 and a DVC CODEC 1006. The DVC 4×/1× VTR 1005 can record and reproduce a DVC compressed signal onto/from a DVC cassette tape 1007 not only at a normal rate but also at a rate four times as high as the normal rate (herein, "1×" means a normal rate and "4×" means a four-times-higher rate). If a tape on which video has been recorded by a cam coder or the like for 60 minutes is reproduced by the VTR 1005 at a four-times-higher rate, it takes only 15 minutes to supply all the data to the PCI bus 1003. In addition, it is also possible for the CODEC 1006 to code in real time video and sound which are input in real time and then supply the coded data to the PCI bus 1003.

Moreover, a network I/F card conformable to ATM standard, Eternet standard, IEEE1394 standard, fiber channel standard or the like can be connected to the PCI bus 1003. In such a case, the system of the seventh example can be connected to server/network systems which are connected to each other to form a LAN or to internet systems which are connected to each other to form a WAN.

The reference numeral 1008 denotes an SCSI I/F board, to which a plurality of hard disk drivers (HDDs) 1009 are connected, thereby forming a disk array (RAID-0, RAID-3, RAID-5 and the like).

A PCI bridge 1010 is connected to the PCI bus 1003 and connected to a main memory 1011, a CPU 1012 such as a Pentium, a cache memory 1013, an IDE interface 1014, an ISA bus 1016, a keyboard and mouse system 1021 and the like. As an IC for the PCI bridge 1010, a TRITON chip set manufactured by Intel can be used, for example. An IDE HDD 1015 is connected to the IDE interface 1014. An OS or an application program such as Windows-NT is installed in the IDE HDD 1015.

A VGA monitor 1017, an audio I/F board 1018 such as Sound Blaster, an RS422 I/F board 1019, an RS232C I/F board 1020 and the like are connected to the ISA bus 1016.

On the other hand, the software section 1002 installed in the HDD 1015 which is a system disk consists of: an HDD device driver 1022; a DVC-I/F device driver 1023; an OS 1024 including a kernel section; a device driver group 1025 for controlling the devices 1017 to 1020 connected to the ISA bus 1016; a file server software layer 1026 for controlling a DVC stream; nonlinear editing application software 1027; application software 1028 such as universal Windows-NT or the like.

A network I/F card conformable to ATM transmission standard or Ethernet transmission standard can be further connected to the PCI bus 1003. By using these network I/F cards, the device drivers thereof, a network server function provided by an OS, and the like, this system can be connected to a server or a separate apparatus of an editing terminal or the like, so that a highspeed transmission of the video and audio data, a file exchange and the like can be performed at a higher speed and more easily.

Next, a method for processing a DVC data stream which is input from the VTR 1005 or the CODEC 1006 to the PCI bus 1003 via the DVC/PC-I/F card 1004 will be described with reference to FIG. 19.

Figure 19:
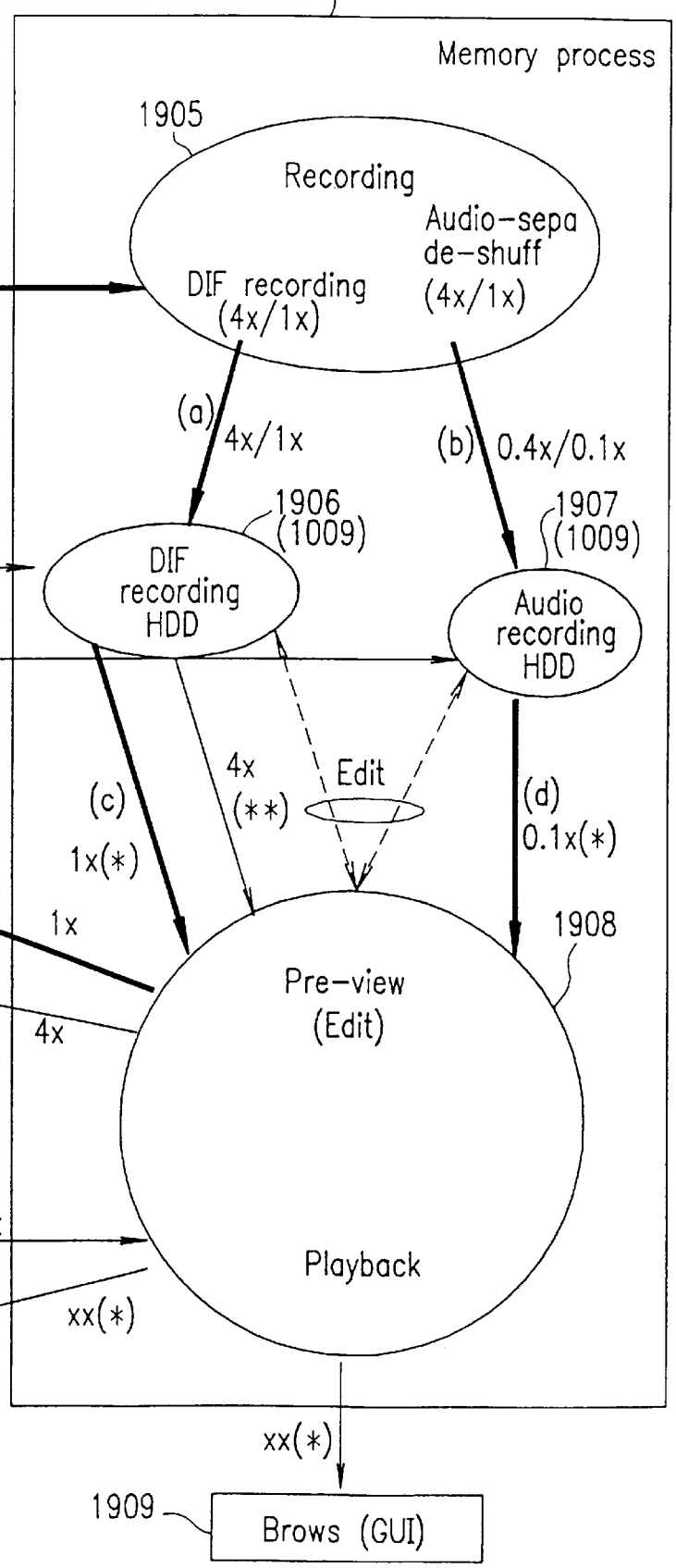
FIG. 19 is a diagram illustrating a method for processing a DVC data stream input to a PCI bus.

In FIG. 19, a memory process using the CPU 1012, the cache memory 1013 and the main memory 1011 shown in FIG. 10 will be called a memory process 1901. In FIG. 19, first, a 1× (or 4×) DVC compressed stream is input to an I/F card 1902 (or the I/F card 1004 shown in FIG. 10) at an input 4× or 1×. The DVC signal stream is assumed to be compressed in conformity with DI form defined by the DVC standard, for example. In the case of NTSC, a signal corresponding to one frame in the DIF form is composed of 1500 blocks. Herein, one block corresponds to data of 80 bytes. One DIF frame is divided into a plurality of sectors such that each sector is composed of 150 blocks: i.e., 1 header block; 2 subcode blocks; 3 VAUX (video auxiliary) blocks; 135 video blocks; and 9 audio blocks. The video blocks and the audio blocks have been shuffled and regularly mixed with each other.

The stream which has been input to the I/F card 1902 at the input 4× or 1× is input to the memory process 1901 via the PCI bus. In performing a recording operation 1905 onto the HDD 1009, first, the DIF signal is directly recorded onto a DIF recording HDD 1906 (or 1009). Simultaneously, in performing the recording operation 1905, only the audio blocks are extracted from the DIF; deshuffled; converted into temporally continuous PCM audio having a compatibility with a file format which is supported by the Windows such as a WAVE system or the like; and then recorded onto an audio recording HDD 1907 (or 1009). It is noted that the present inventors obtained an experimental result that, in the case of using a Pentium (clock: 100 MHz) as a CPU, the conversion time was about 0.6 msec which is sufficiently shorter than one frame period or 33.3 msec of an NTSC system. Even in the case of the 4× input, it takes 2.4 msec to perform this conversion, so that real time performance can be sufficiently secured even by the use of software processing.

As described above, in the memory process during the recording operation, (1) recording a DIF signal onto the DIF recording HDD 1906 and (2) converting an audio signal into a PCM signal in real time and then recording the signal onto the audio recording HDD 1907 are performed with respect the 1× input and the 4× input.

In this case, a DIF signal has a high data rate in the recording and reproducing operations. Thus, if a DIF signal is passed through a file system supported by an OS, the overhead of the file system makes it impossible to perform a real-time recording operation. Thus, the DIF signal is recorded and reproduced onto/from the HDD by using a dedicated file system newly produced by an application without passing the DIF signal through the file system supported by the OS. Therefore, though the file of the DIF signals recorded on the HDD cannot be directly viewed from the OS, the file can be recognized by using a file management table exclusively used for the application. On the other hand, since an audio signal has a low data rate in the recording and reproducing operations, the audio signal can be passed through a file system managed by an OS such as FAT, NTFS or HPFS.

Next, a video editing operation will be described. For editing a video, first, the video recorded on the video recording HDD is displayed on a VGA monitor or an NTSC monitor as a clip video indicating an in-point and an out-point for the editing operation by using an editing application. In displaying a DVC compressed video, since full decoding takes much time, first, only the DC components of the compressed video are decoded on the software, thereby instantaneously performing Braun's screen display. When full decoding of a high-quality video, which is executed in the background, is finished: the DC component video can be replaced by a full decoded video of high image quality which is to be displayed. In this way, the in-point and the out-point of a video event are designated by using a clip video retrieved on the VGA monitor. Then, a title is produced as an assembly of a plurality of events and an editing title list having editing control information of reproducing rate or the like is recorded on the HDD 1015.

Next, an audio editing operation will be described. In general, when a DIF signal which has been subjected to cut editing is reproduced, the sampling cyclic characteristics of an audio signal are lost at the connection portion of the video, so that unpleasant noise is adversely generated. An audio signal is recorded onto the audio recording HDD 1907 via the recording process 1905, the sound I/F board 1904 and the editing/reproducing process 1908. The in-point and the out-point of an audio event are edited so as to correspond to real reproduction time of a video title, thereby associating the audio event/title with the video event/title.

A DVC sound is characterized in that (1) the sampling number within one frame period is 1600±20 samples in an unlock mode and that (2) the sampling number within one frame period is a cyclic and alternate combination of 1600 samples and 1602 samples particularly in a lock mode mainly used for business. When the cyclic characteristics of the sampling structure are damaged by cut editing, noise is likely to be generated. Thus, if the sampling continuity is secured in cut editing and a crossfade at the discontinuous point or mixing of multichannel sound is performed by converting the sound into PCM sound by the memory process, then audio signal processing can be performed easily while maintaining high-quality sound.

In reproducing video and sound during a preview operation, it is possible to (1) output a browser of the video from an LVD and output sound from a sound I/F card separately from the LVD, (2) output the browser of the video from the LVD and output PCM sound on an audio disk from a sound I/F card and the like.

In reproducing video and sound in the DIF signal form after editing is finished, it is possible to (1) output from the LVD alone, (2) output a new DIF signal by synthesizing a video from the LVD and PCM sound on the audio disk in real time by the memory process, and the like.

If the above-described audio signal processing is performed on hardware, the hardware configuration becomes very complicated. However, by converting sound into a DIF signal and a PCM signal in real time while using a memory process according to the present invention, not only the hardware configuration can be simplified but also editing/reproducing operations can be performed very efficiently.

On the other hand, if the video/audio editing operations are repeatedly performed, then a so-called "fragmentation" problem (i.e., necessary data in an HDD are non-uniformly distributed) is generally caused. When a fragmentation is generated, it becomes adversely difficult to secure successive sectors in the HDD for smoothly performing the 4× recording operation. Thus, in order to cope with such a fragmentation, necessary data which have already been edited are assumed to be recorded so as to concentrate in an inner circumference of the HDD. As a result, the 4× recording operation can be newly performed in the outer circumferential region of the HDD in which data can be recorded at a high speed.

EXAMPLE 8

Figure 13:
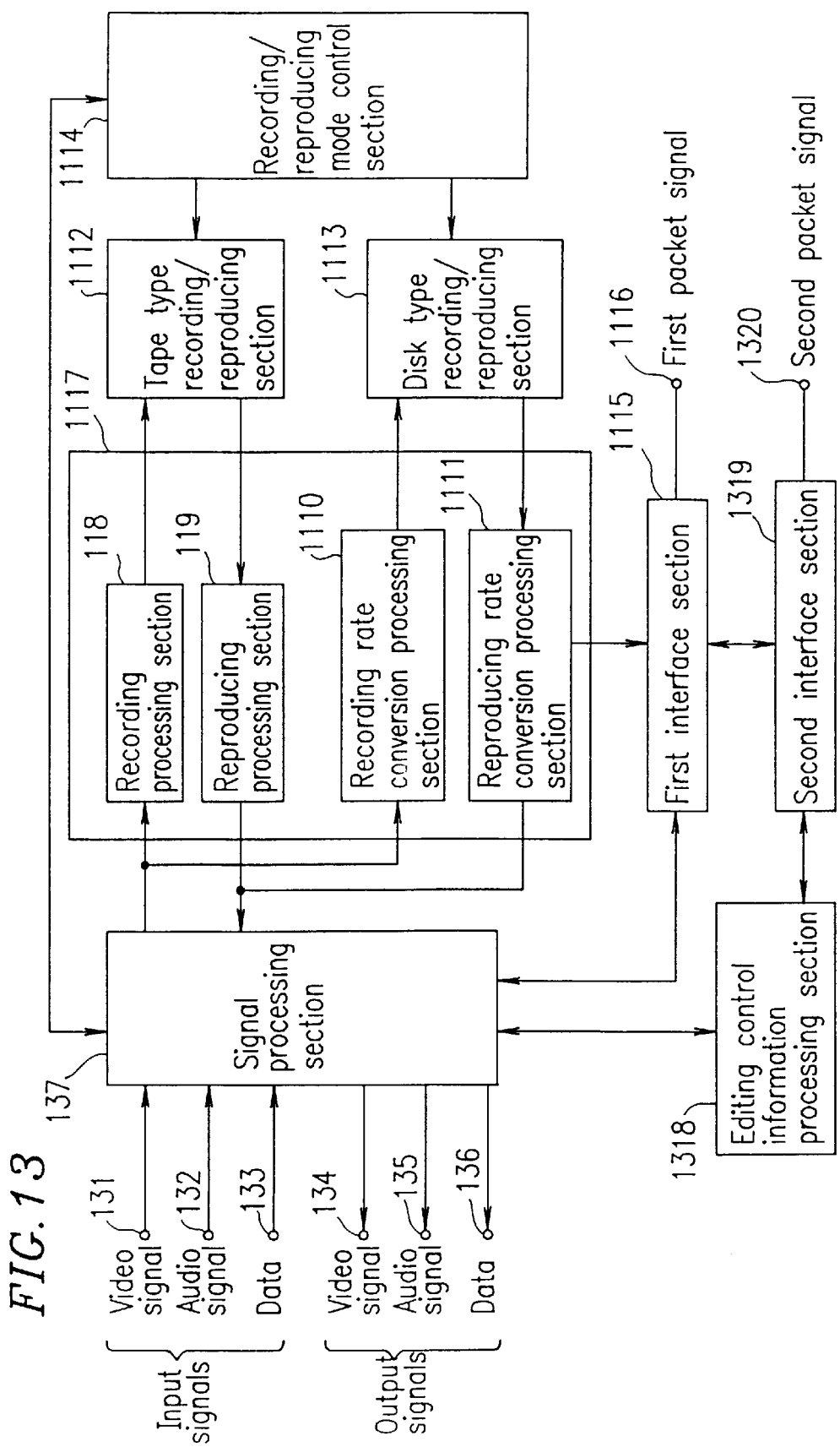
FIG. 13 is a block diagram illustrating an eighth example of the recording and reproducing apparatus according to the present invention.

FIG. 13 is a block diagram illustrating an eighth example of the recording and reproducing apparatus according to the present invention. The eighth example is different from the sixth example in that: an editing control information processing section 1318 and a second interface section 1319 are connected to a signal processing section 137; drive information of a tape type recording/reproducing section 1112 or a disk type recording/reproducing section 1113 (or information indicating whether the signal is recorded/reproduced by the tape type recording/reproducing section 1112 or the disk type recording/reproducing section 1113), editing control information (or information about the rate conversion, editing control, etc.) and the like are added by the editing control information processing section 1318; the signal to which the editing control information is added is passed through the second interface section 1319, thereby outputting a second packet signal through a second packet signal output terminal 1320 such that the signal can be packetized easily.

Next, the operation of the recording and reproducing apparatus of the eighth example, for which the first interface section 1115 and the second interface section 1319 are hierarchically provided, will be described with reference to FIG. 13.

In order to improve the efficiency during the editing operation for broadcasting and the like, it is advantageous to preset and register various reproduction modes for a disk including: a normal reproducing mode; high-speed reproducing modes at 2, 3, and 10-times-fast speeds; slow reproducing modes at ½, ⅓, . . . and 1/10-times-fast speeds; backward reproducing modes; and backward slow reproducing modes. This is because, by converting the reproducing speed in accordance with these modes, a desired signal to be edited can be transferred from the reproducing rate conversion processing section 1111 to the first interface section 1115 so as to be output as a first packet signal through the output terminal 1116. Furthermore, the signal is input to the editing control information processing section 1318 via the second interface section 1319; editing control information about the reproduced signal is added by the editing control information processing section 1318 to the signal; and then the signal is passed through the signal processing section 137 so as to be output through the output terminals 134, 135 and 136.

If the recording and reproducing apparatus of the present invention is connected to a computer or the like such that the signal is transmitted to the computer via the first interface section 1115, the second interface section 1319 and the second packet signal output terminal 1320 during the above-described operation, various editing operations, including setting a reproduction speed at an arbitrary speed and designating a slow reproducing mode or a still picture reproducing mode, can be easily performed within a short time on the computer by using software, so that a nonlinear editing operation can be efficiently performed.

In this case, it is possible to use programs using an assembly language, a C language and the like as the software, for example.

In addition, the disk type recording/reproducing section 1113 has advantages in that a search operation can be performed rapidly and easily and that the software is less likely to be degraded.

As described above, the recording and reproducing apparatus of the eighth example also includes: the tape type recording/reproducing section 1112; the disk type recording/reproducing section 1113; the signal processing section 137 enabling a bidirectional signal transmission between these two recording/reproducing sections 1112 and 1113; and the recording/reproducing mode control section 1114 for transmitting control signals to the respective control sections, and respective control sections control the operations of the respective sections in accordance with various operation modes, in the same way as in the sixth example. Therefore, an editing operation or the like, which has conventionally been impossible unless a plurality of recording and reproducing apparatuses are used, can be realized easily. Moreover, data can be recorded on a disk while reproducing a signal recorded on a tape, or data recorded on a disk can be reproduced while recording data on a tape. Therefore, simultaneous processing can be performed on a tape and a disk. That is to say, while recording a real time input signal, it is possible to effectively and simultaneously perform a normal reproducing operation and a trick play reproducing operation, a signal transmission, a nonlinear editing operation and the like with respect to a signal which was recorded in the past.

EXAMPLE 9

Figure 14:
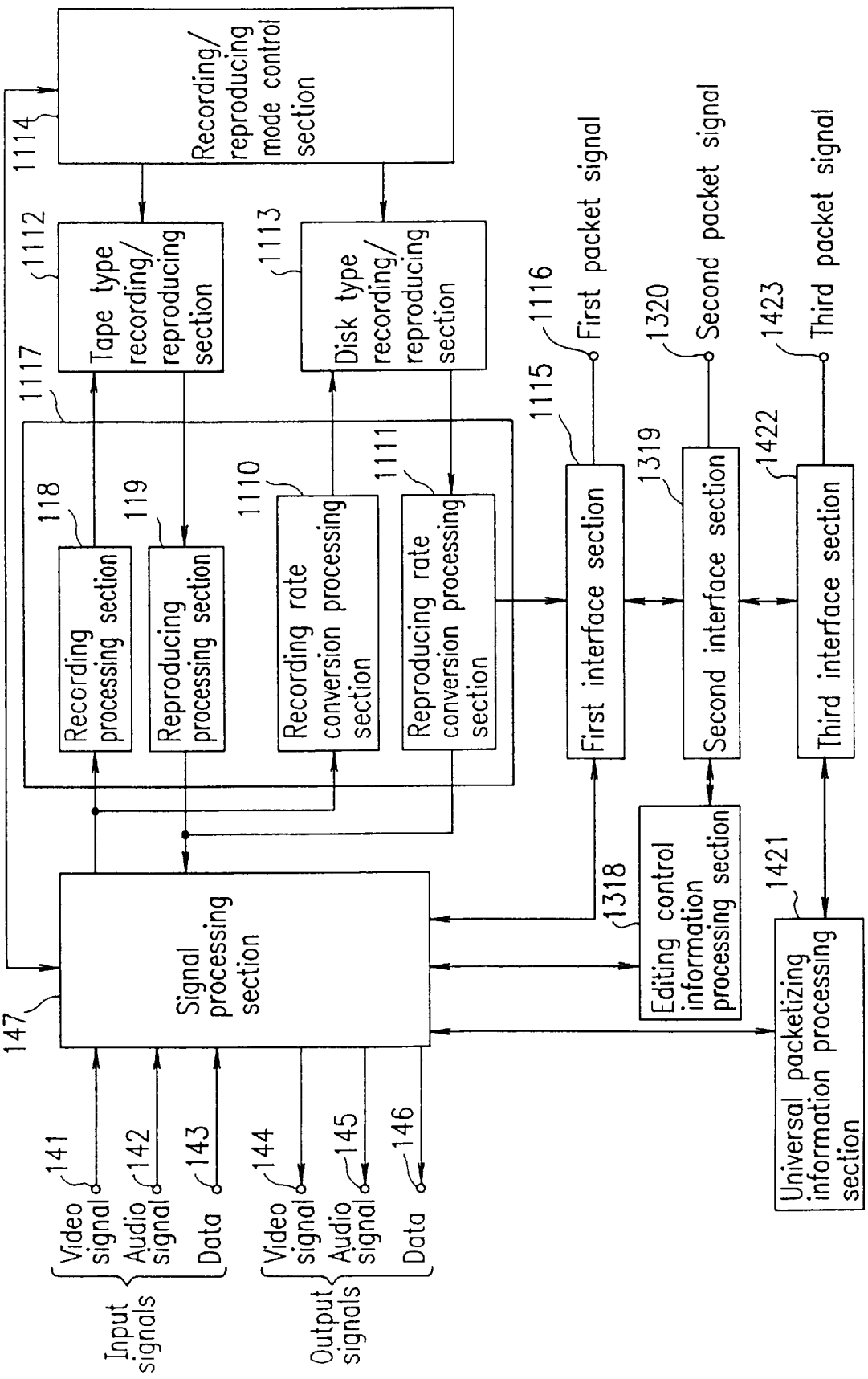
FIG. 14 is a block diagram illustrating a ninth example of the recording and reproducing apparatus according to the present invention.

FIG. 14 is a block diagram illustrating a ninth example of the recording and reproducing apparatus according to the present invention. The configuration of the ninth example is different from that of the eighth example in that: a third interface section 1422 and a universal packetizing information processing section 1421 are connected to the output of the second interface section 1319; universal packetizing information is added by the universal packetizing information processing section 1421 to a reproduced signal from the reproducing rate conversion processing section 1111 such that the reproduced signal conforms to a transport standard signal of an MPEG system, for example; and the third interface section 1422 outputting the signal, to which the information is added, through a terminal 1423 as a third packet signal conformable to the MPEG system is provided.

Next, the operation of the recording and reproducing apparatus of the ninth example, to which the respective interface sections are hierarchically provided, will be described with reference to FIG. 14.

In FIG. 14, video, sound and data to be coded into a digital signal of 30 Mbps which is DVC compressed data having a high transfer rate; video, sound and data to be coded into a digital signal of about 1.5 Mbps in conformity with the MPEG-1 standard; video, sound and data to be coded into a digital signal in conformity with the MPEG-2 standard; and the like are input through the terminals 141, 142 and 143.

With respect to these input signals, the signal processing section 147 performs additional special effects, overlapping of character information, deletion of unnecessary data, addition of time data and index data, and the like by means of programmable signal processing, thereby improving the additional value of the data. In addition, an external input/output interface section enables to transmit/receive a signal to/from external apparatuses.

When a signal is input to this external input/output interface section (or the third interface section 1422 in this example), the third interface section 1422 makes the universal packetizing information processing section 1421 add to this signal the universal packetizing information (defined by the transport protocol) enabling to transmit/receive a signal to/from external apparatuses, thereby enabling to transmit/receive a signal to/from external apparatuses.

In addition, the external input/output interface sections such as the third interface section 1422 are configured so as to conform to IEEE1394 standard, SCSI standard, SCSI-2 standard, SCSI-3 standard and the like. As a result, the above-described recording and reproducing apparatus processing a digital signal makes it possible to communicate data with other AV apparatuses and computers such as a DOS/V machine. For example, after the collected data used for broadcasting and the like are nonlinearly edited, the edited data can be communicated all over the world in real time through cable data lines, satellite data lines and the like.

In the foregoing description of the examples, a DVC, one of digital VTRs, is used as an exemplary tape type recording and reproducing apparatus. However, the same effects can be attained by using other digital VTRs such as D3 and D5. On the other hand, a hard disk driving apparatus (HDD) has been described as an exemplary disk type recording and reproducing apparatus. However, the same effects can be attained by using other disk type recording and reproducing apparatuses such as a driving apparatus for a phase change type optical disk, a driving apparatus for a magneto-optical disk, and a floppy disk driving apparatus (FDD). If the recording capacity of a recording medium used for the HDD or the disk type recording/reproducing section 1113 is about 1 Gbytes, for example, then the recording signal rate applied to a packet header and the like becomes 2 Mbps or less because the compression rate conformable to the MPEG-1 standard is as high as 1.5 Mbps. As a result, a recording operation can be performed for 60 minutes or longer on this HDD.

EXAMPLE 10

Figure 15:
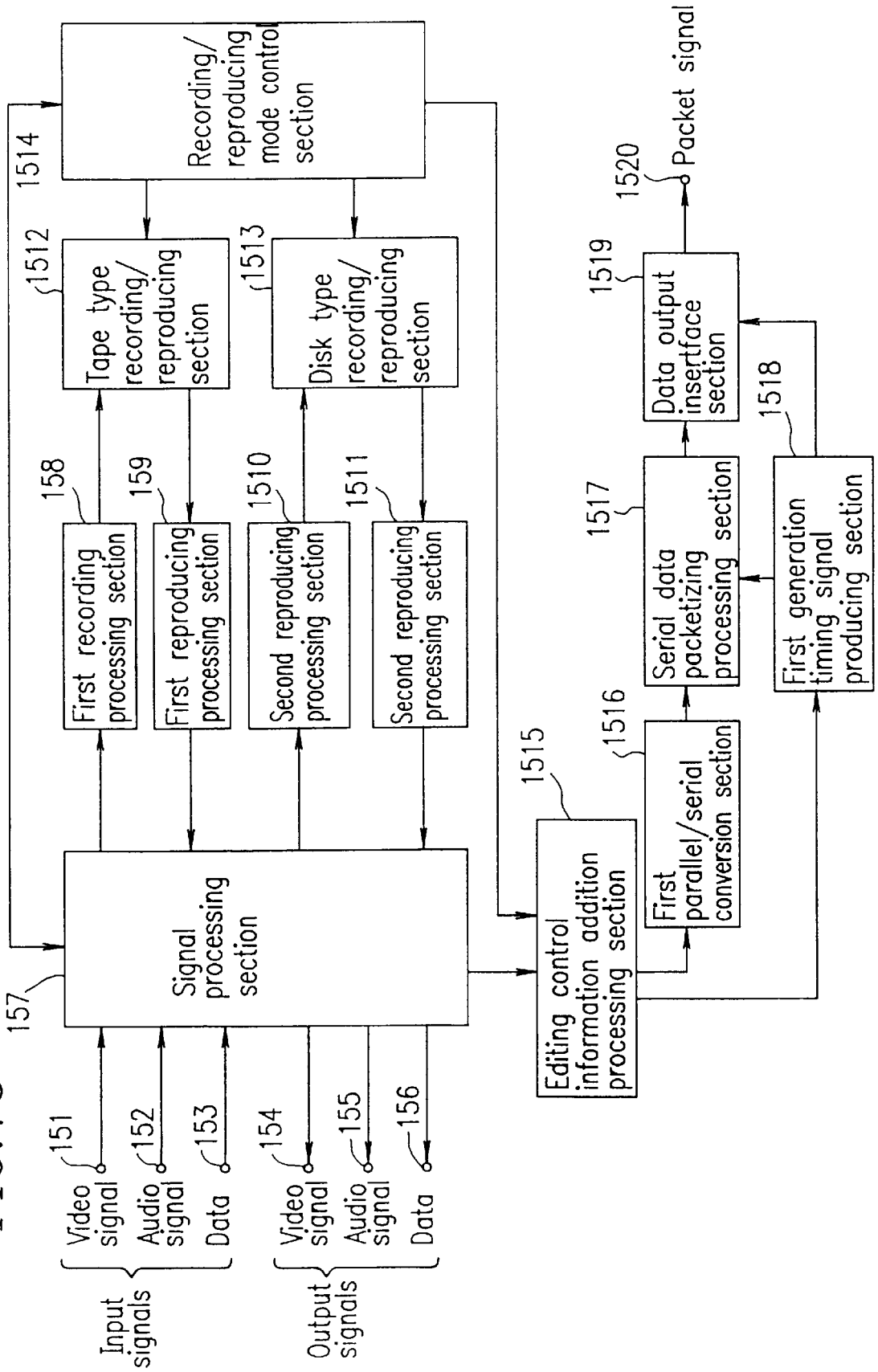
FIG. 15 is a block diagram illustrating a tenth example of the recording and reproducing apparatus according to the present invention.

FIG. 15 is a block diagram illustrating a tenth example of the recording and reproducing apparatus according to the present invention.

In FIG. 15, the reference numeral 151 denotes a video signal input terminal; 152 denotes an audio signal input terminal; 153 denotes a data input terminal; 154 denotes a video signal output terminal; 155 denotes an audio signal output terminal; 156 denotes a data output terminal; 157 denotes a signal processing section; 158 denotes a first recording processing section; 159 denotes a first reproducing processing section; 1510 denotes a second recording processing section; 1511 denotes a second reproducing processing section; 1512 denotes a tape type recording/reproducing section; 1513 denotes a disk type recording/reproducing section; 1514 denotes a recording/reproducing mode control section; 1515 denotes an editing control information addition processing section; 1516 denotes a first parallel/serial conversion section; 1517 denotes a serial data packetizing processing section; 1518 denotes a first generation timing signal producing section; 1519 denotes a data output interface section; and 1520 denotes a packet signal output terminal.

The operation of the recording and reproducing apparatus having such a configuration will be described with reference to FIG. 15.

First, the recording and reproducing operations on a tape shaped medium will be described.

The three types of input signals, i.e., a video signal input through the video signal input terminal 151, an audio signal input through the audio signal input terminal 152 and data input through the data input terminal 153 are subjected by the signal processing section 157 to rearranging or compression processing so as to be converted into one type of process signal and then input to the first recording processing section 158. The process signal is converted by the first recording processing section 158 into a recording signal suitable for the tape shaped medium so as to be input to the tape type recording/reproducing section 1512. In accordance with a control signal supplied from the signal processing section 157, the recording/reproducing mode control section 1514 sets the tape type recording/reproducing section 1512 in a recording mode, whereby the recording signal is recorded by the tape type recording/reproducing section 1512 onto the tape-shaped recording medium.

In performing a reproducing operation, the recording/reproducing mode control section 1514 sets the tape type recording/reproducing section 1512 in a reproducing mode in accordance with a control signal supplied from the signal processing section 157 and the signal reproduced from the tape shaped medium by the tape type recording/reproducing section 1512 is input to the first reproducing processing section 159. In the first reproducing processing section 159, the reproduced signal is subjected to signal processing inverse to that performed by the first recording processing section 158, so as to become one type of process signal similar to the signal generated in the recording processing and then input to the signal processing section 157. In the signal processing section 157, the process signal is converted into three types of signals, i.e., a video signal, an audio signal and data. Then, the three types of signals, i.e., the video signal, the audio signal and the data, are output from the video signal output terminal 154, the audio signal output terminal 155 and the data output terminal 156, respectively.

Next, the recording and reproducing operations on a disk shaped medium will be described.

The three types of input signals, i.e., a video signal input through the video signal input terminal 151, an audio signal input through the audio signal input terminal 152 and data input through the data input terminal 153 are converted by the signal processing section 157 into one type of process signal in the same way as in the recording and reproducing operations on a tape shaped medium and then input to the second recording processing section 1510. The process signal is converted by the second recording processing section 1510 into a recording signal suitable for the disk shaped medium so as to be input to the disk type recording/reproducing section 1513. In accordance with a control signal supplied from the signal processing section 157, the recording/reproducing mode control section 1514 sets the disk type recording/reproducing section 1513 in a recording mode, whereby the recording signal is recorded by the disk type recording/reproducing section 1513 onto the disk shaped recording medium.

In performing a reproducing operation, the recording/reproducing mode control section 1514 sets the disk type recording/reproducing section 1513 in a reproducing mode in accordance with a control signal supplied from the signal processing section 157 and the signal reproduced from the disk shaped medium by the disk type recording/reproducing section 1513 is input to the second reproducing processing section 1511. In the second reproducing processing section 1511, the reproduced signal is subjected to signal processing inverse to that performed by the second recording processing section 1510, so as to become one type of process signal similar to the signal generated in the recording processing and then input to the signal processing section 157. In the signal processing section 157, the process signal is converted into three types of signals, i.e., a video signal, an audio signal and data. Then, the three types of signals, i.e., the video signal, the audio signal and the data, are output from the video signal output terminal 154, the audio signal output terminal 155 and the data output terminal 156, respectively.

Editing control information for the tape type recording/reproducing section 1512 and the disk type recording/reproducing section 1513 is supplied from the recording/reproducing mode control section 1514 and then added by the editing control information addition processing section 1515 to the process signal produced by the signal processing section 157, so that the process signal becomes parallel data to be input to the first parallel/serial conversion section 1516. The editing control information added in this section includes various information about the video recording conditions such as a video recording date, person who recorded the video and a video recording place and information about reproduction conditions such as identifiers for a normal reproduction and a trick-play reproduction.

The parallel data is converted by the first parallel/serial conversion section 1516 into a serial signal, which is input to the serial data packetizing processing section 1517. In the serial data packetizing processing section 1517, a channel number is added to the serial data output from the first parallel/serial conversion section 1516 and the data is multiplexed on the time axis and packetized in synchronization with the first generation timing signal output from the first generation timing signal producing section 1518. Then, the time axis is divided into a plurality of frame periods, each of which has a constant length; each frame period is further divided into a plurality of unit packet transport periods; and the serial data which has been packetized during one or a plurality of unit packet transport period(s) is input to the data output interface section 1519.

In the case where the signal output from the editing control information addition processing section 1515 is serial, the signal output from the editing control information addition processing section 1515 is directly input to the serial data packetizing processing section 1517 without passing through the first parallel/serial conversion section 1516.

In accordance with a control signal supplied from the editing control information addition processing section 1515, the first generation timing signal producing section 1518 produces a first generation timing signal for generating respective packets and a first clock signal for outputting a packet signal. The packet signal is output from the data output interface section 1519 to the packet signal output terminal 1520 in synchronization with the first clock signal during a particular packet transport period determined based on a packet number.

EXAMPLE 11

Figure 16:
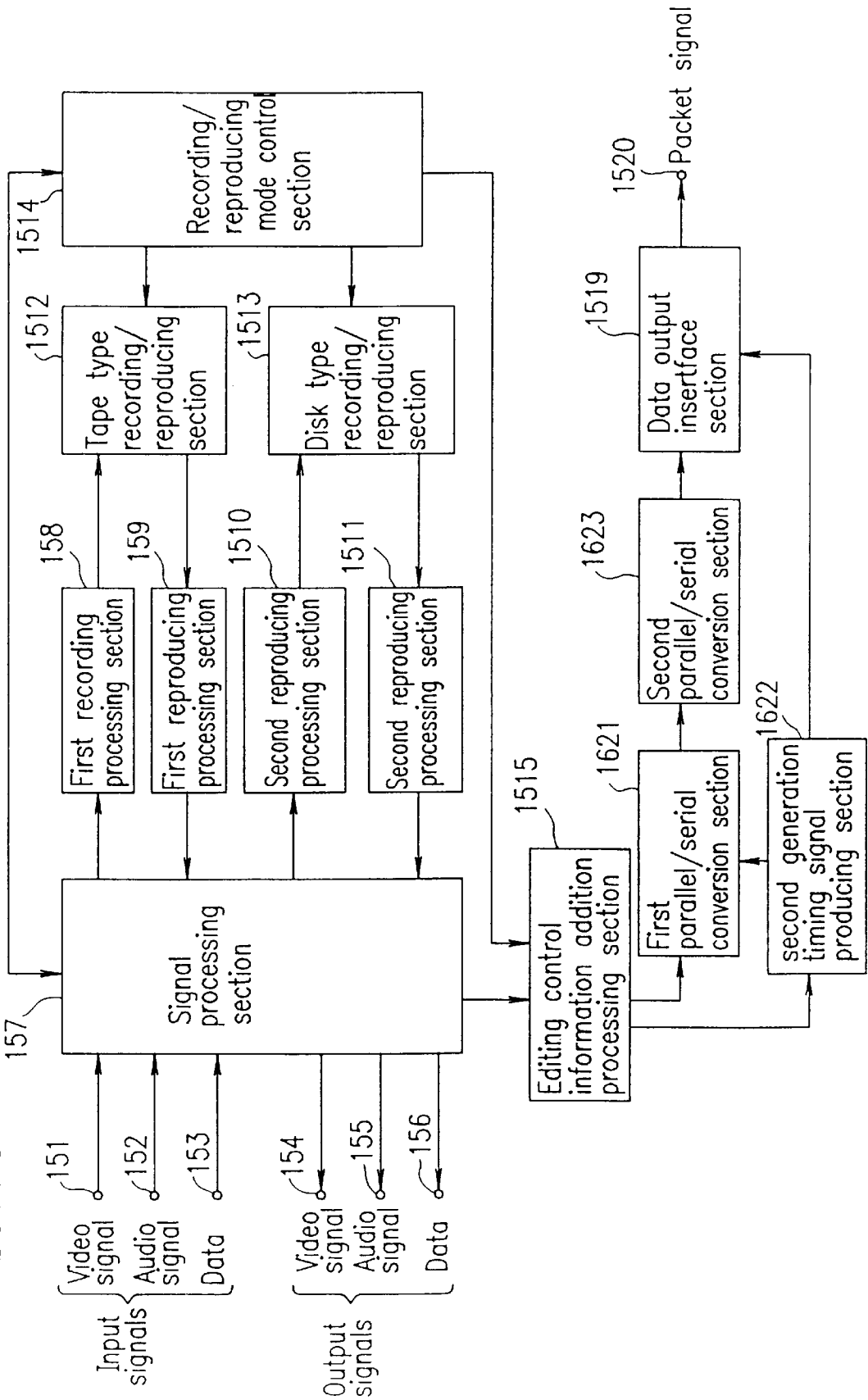
FIG. 16 is a block diagram illustrating an eleventh example of the recording and reproducing apparatus according to the present invention.

FIG. 16 is a block diagram illustrating an eleventh example of the recording and reproducing apparatus according to the present invention. In FIG. 16, the reference numeral 1621 denotes a parallel data packetizing processing section; 1622 denotes a second generation timing signal producing section; and 1623 denotes a second parallel/serial conversion section, and the remaining components in the eleventh examples are the same as those of the tenth example shown in FIG. 15.

The operation of the recording and reproducing apparatus having such a configuration will be described with reference to FIG. 16. It is noted that, in the eleventh example, the components having the same configurations as those in the tenth example or the components operating in the same way as those in the tenth example will not be described because they have already been described in the tenth example.

Editing control information for the tape type recording/reproducing section 1512 and the disk type recording/reproducing section 1513 is supplied from the recording/reproducing mode control section 1514 and then added by the editing control information addition processing section 1515 to the process signal produced by the signal processing section 157, so that the process signal becomes parallel data to be input to the parallel data packetizing processing section 1621. In the parallel data packetizing processing section 1621, a channel number is added to the parallel data output from the editing control information addition processing section 1515 and the data is multiplexed on the time axis and packetized in synchronization with the second generation timing signal output from the second generation timing signal producing section 1622.

Then, the time axis is divided into a plurality of frame periods such that each frame period has a constant length; each frame period is further divided into a plurality of unit packet transport periods; and the parallel data which has been packetized during one or a plurality of unit packet transport period(s) is input to the data output interface section 1519. The parallel data output from the parallel data packetizing processing section 1621 is converted by the second parallel/serial conversion section 1623 into a serial signal to be input to the data output interface section 1519. In accordance with a control signal supplied from the editing control information addition processing section 1515, the second generation timing signal producing section 1622 produces a second generation timing signal for generating respective packets and a second clock signal for outputting a packet signal. The packet signal is output from the data output interface section 1519 to the packet signal output terminal 1520 in synchronization with the second clock signal during a particular packet transport period determined based on a packet number. The other operation is the same as that of the tenth example.

Figure 17:
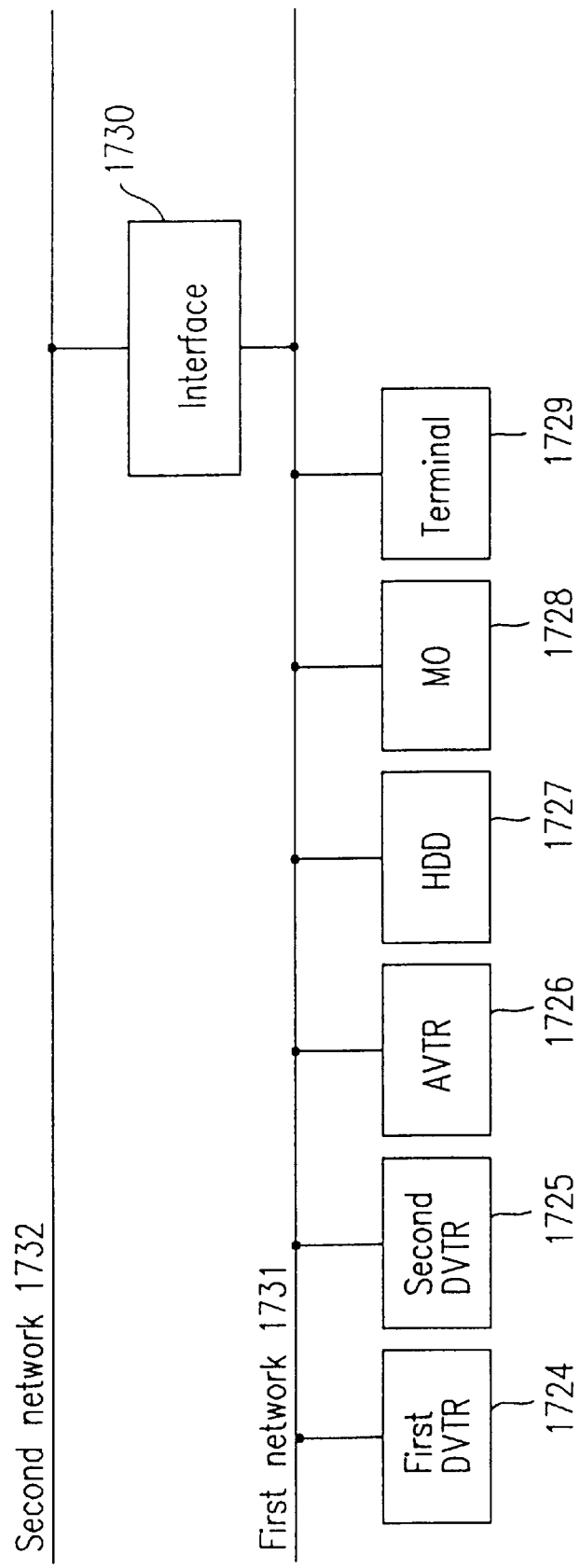
FIG. 17 is a diagram showing an exemplary configuration for connecting the recording and reproducing apparatus in the tenth and the eleventh examples to a network.
Figure 18:
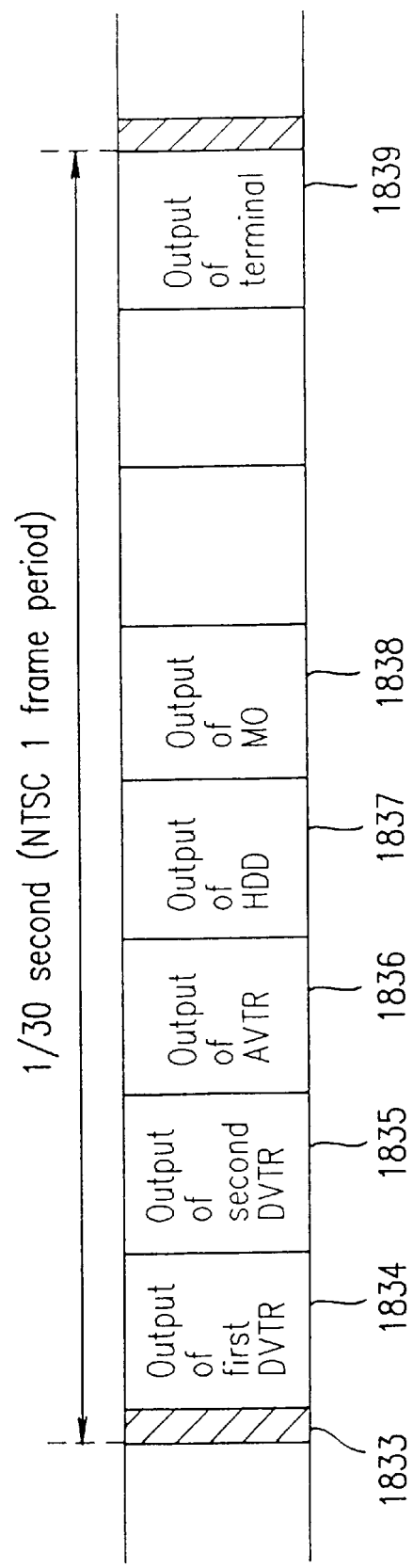
FIG. 18 is a diagram showing the respective packet signals which are transmitted in a first network 1731 during one frame period in the configuration shown in FIG. 17.

FIG. 17 is a diagram showing an exemplary configuration for connecting the recording and reproducing apparatus in the tenth and the eleventh examples to a network. FIG. 18 is a diagram showing the respective packet signals which are transmitted in a first network 1731 during one frame period in the configuration shown in FIG. 17. Therefore, the data multiplexed on the time axis as shown in FIG. 18 indicates the data output from the packet signal output terminal 1520 shown in FIGS. 15 and 16.

In FIG. 17, the reference numeral 1724 denotes a first digital VTR (hereinafter, simply referred to as a "DVTR"); 1725 denotes a second DVTR (in this example, a DVC is used as the DVTR); 1726 denotes an analog VTR (hereinafter, simply referred to as an "AVTR"); 1727 denotes a hard disk driving apparatus (hereinafter, abbreviated to as an "HDD"); 1728 denotes a magnetooptical disk apparatus (hereinafter, abbreviated as an "MO"); 1729 denotes a terminal; 1730 denotes an interface apparatus; 1731 denotes a first network; and 1732 denotes a second network. As the first network 1731, an SCSI bus which is an eight bit parallel bus or a PCI bus can be used, for example. As the second network 1732, a coaxial cable defined by SMPTE 259M standard can be used, for example. This cable conformable to the SMPTE 259M standard can carry data of 270 Mbps. Therefore, assuming that the data rate per device (e.g., the first DVTR 1724) connected to the first network 1731 is 30 Mbps, it is theoretically possible to connect nine devices in total to the first network 1731.

In FIG. 18, the reference numeral 1833 denotes a header output from the terminal 1729; 1834 denotes a packet signal output from the first DVTR 1724; 1835 denotes a packet signal output from the second DVTR 1725; 1836 denotes a packet signal output from the AVTR 1726; 1837 denotes a packet signal output from the HDD 1727; 1838 denotes a packet signal output from the MO 1728; and 1839 denotes a signal output from the terminal 1729.

In this case, the terminal 1729 is a master apparatus for performing an input/output control and a task management for the other apparatuses connected to the first network 1731. The first DVTR 1724, the second DVTR 1725 and the AVTR 1726 are recording and reproducing apparatuses having a configuration of the tenth or the eleventh example of the present invention and are slave apparatuses which perform processing under the direction or the control of the terminal 1729.

The operations of the various recording and reproducing apparatuses connected to the first network 1731 in such a manner will be described with reference to FIGS. 17 and 18.

The first network 1731 is a data network having a transmission rate of 300 Mbps, for example, while the second network 1732 is a universal network such as an Ethernet. In the interface apparatus 1730, the transfer rate of the signal transmitted in the first network 1731 is converted and then output to the second network 1732. To the contrary, the transfer rate of the signal transmitted in the second network 1732 is converted and then output to the first network 1731.

The header 1833 output from the terminal 1729 is added by the terminal 1729 to the packet signal 1834 output from the first DVTR 1724, the packet signal 1835 output from the second DVTR 1725, the packet signal 1836 output from the AVTR 1726, the packet signal 1837 output from the HDD 1727, the packet signal 1838 output from the MO 1728, the signal 1839 output from the terminal 1729 and the like, so that these signals become signals corresponding to one frame period (one-thirtieth of a second) and then output to the first network 1731.

The contents of the packet signals which have been divided in the above-described manner so as to correspond to one frame period and are transmitted in the first network 1731 will be described with reference to FIG. 18.

During one frame period (one-thirtieth of a second), the header 1833 output from the terminal 1729, the packet signal 1834 output from the first DVTR 1724, the packet signal 1835 output from the second DVTR 1725, the packet signal 1836 output from the AVTR 1726, the packet signal 1837 output from the HDD 1727, the packet signal 1838 output from the MO 1728, the signal 1839 output from the terminal 1729 and the like are transmitted in the first network 1731.

In this example, the terminal 1729 connected to the first network 1731 is used as a master for performing an input/output control and a task management for the other apparatuses connected to the first network 1731, thereby controlling the respective packet signals. However, the same effects can be attained even when a terminal connected to the second network 1732, a recording and reproducing apparatus shown in FIGS. 15 and 16 or the like is used as a master, thereby controlling the respective packet signals. Also, an Ethernet is used as the second network 1732 in this example. However, the same effects can be attained even when any other network such as ATM, SDI (SMPTE 259M), P1394, P1355, AV-BUS or CE-BUS is used. Furthermore, a DVC is used as a digital VTR. However, the same effects can be attained even when any other digital VTR such as D3 or D5 is used.

Moreover, a signal produced by mixing (or overlapping) three types of signals, i.e., video, sound and data, is assumed to be packetized in this example. However, the three signals are not always necessary and a signal including at least one of the three signals may be used. Furthermore, the recording and reproducing apparatus shown in FIGS. 15 and 16 is configured as an apparatus for generating and outputting packet signals. However, if the sections of the recording and reproducing apparatus shown in FIGS. 15 and 16 for generating and outputting packet signals and the associated sections are configured so as to perform inverse signal processing, the apparatus may also be used as an apparatus for inputting and recording/reproducing packet signals.

As is apparent from the foregoing description, the recording and reproducing apparatus of the present invention can quickly find a desired video by performing a search operation using characters in a sub-code region during the reproduction of the information recorded on a disk. In addition, text data such as a long sentence which is associated with the video can be displayed.

Moreover, while recognizing the videos reproduced by a plurality of DVCs (e.g., four DVCs) on the respective monitors, a video which an editor desires to retrieve can be accurately recorded on a video server (or a disk array), so that post-recording editing efficiency can be considerably improved.

In the present invention, (1) recording a DIF signal onto the DIF recording HDD 1906 and (2) converting an audio signal into a PCM signal in real time and then recording the signal onto the audio recording HDD. 1907 are performed with respect the 1× input and the 4× input. As a result, an audio signal is processed as a file format which is supported by the Windows as a standard function, while the DIF signal is recorded in real time.

Furthermore, open system performance and the like can be secured by an ATM transmission, A/B roll editing and use of common API.

Furthermore, the recording and reproducing apparatus of the present invention includes a tape type recording/reproducing section for recording/reproducing a signal onto/from a tape shaped medium and a disk type recording/reproducing section for recording/reproducing a signal onto/from a disk shaped medium as recording/reproducing sections, thereby recording, reproducing and editing at least one signal of a video signal, an audio signal and data. The apparatus further includes: a reproducing rate conversion processing section for converting the reproducing rate of a process signal produced from at least one of the video signal, the audio signal and the data which have been recorded on the disk shaped medium and outputting the process signal; and first to third interface sections for outputting first to third packet signals, so that the reproducing rate of the recorded information can be converted easily and the recording and reproducing operations on the tape shaped medium and the recording and reproducing operations on the disk shaped medium can be performed simultaneously. As a result, it is possible to provide a transmission system having a configuration in which the reproduced process signal can be transmitted at a high rate and the recording rate or the reproducing rate of the data having a compatibility with an MPE system can be varied. As a result, a hybrid recording and reproducing apparatus configured by the tape type recording/reproducing section and the disk type recording/reproducing section can be extended to computer and communication fields.

Furthermore, the recording and reproducing apparatus of the present invention is configured to include: an editing control information addition processing section; a data packetizing processing section; a generation timing signal producing section; and a data output interface section, so that the respective packet signals produced from a video signal, an audio signal, data and the like can be controlled by a terminal and the respective packet signals can be effectively transmitted.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording and reproducing apparatus for recording and reproducing hybrid data, including at least one of video data, audio data and additional data, onto a recording medium, comprising:
   a tape recording/reproducing unit for recording and reproducing the hybrid data by using a tape medium as the recording medium;
   a disk recording/reproducing unit for recording and reproducing the hybrid data by using a disk medium as the recording medium;
   a recording rate conversion unit operatively configured with the disk recording/rerroducing unit to record input hybrid data at a rate different from a normal recording rate at which the tare recording/reproducing unit concurrently records the input hybrid data;

a reproducing rate conversion unit operatively configured with the disk recordinq/reproducing unit to reproduce the recorded input hybrid data at a rate different from a normal reproducing rate at which the tape recording/reproducing unit would normally reproduce the recorded input hybrid data; and a first interface unit for packetizing the hybrid data output from the reproducing rate conversion unit and inputting/outputting the packetized hybrid data, wherein the disk recording/reproducing unit is operatively configured with the recording rate conversion unit and the reproducing rate conversion unit to reproduce recorded input hybrid data while effectively simultaneously recording other input hybrid data concurrently being recorded by the tape recording/reproducing unit.

2. A recording and reproducing apparatus according to claim 1, further comprising a recording/reproducing mode control unit for controlling operation modes of the tape recording/reproducing unit and the disk recording/reproducing unit.

3. A recording and reproducing apparatus according to claim 2, further comprising a signal processing unit for receiving the video data, the audio data and the additional data and outputting these data as the hybrid data, the signal processing unit comprising:

a coding/decoding unit for coding or decoding in accordance with an input/output signal;

an error correction coding/decoding unit for performing error correction coding or error correction decoding on signals which are recorded and reproduced by the tape recording/reproducing unit and the disk recording/reproducing unit, respectively;

a signal transmission unit for bidirectionally transmitting a signal between the coding/decoding unit and the error correction coding/decoding unit;

a control unit for controlling a transmission direction of the signal transmission unit; and a control signal generation unit for generating a control signal for the control unit in accordance with a mode control signal output from the recording/reproducing mode control unit.

4. A recording and reproducing apparatus according to claim 3, wherein the coding/decoding unit comprises:

a multiplexing section for multiplexing input data on a time axis, thereby generating a single data stream;

a shuffling section for shuffling the data stream;

a compression section for compressing on the time axis data output from the shuffling section;

a deshuffling section for deshuffling data output from the compression section; and a signal coding/decoding section for coding data output from the deshuffling section.

5. A recording and reproducing apparatus according to claim 4, further comprising a second interface unit for adding editing control information for the tape recording/reproducing unit or the disk recording/reproducing unit to data output from the first interface unit.

6. A recording and reproducing apparatus according to claim 5, further comprising a third interface unit for adding universal packetizing information conformable to a transport standard for an MPEG system to data output from the second interface unit.

* * * * *